United States Patent
Tsai et al.

(10) Patent No.: US 8,456,757 B2
(45) Date of Patent: Jun. 4, 2013

(54) IMAGE CAPTURING OPTICAL LENS ASSEMBLY

(75) Inventors: Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 99 days.

(21) Appl. No.: 13/293,110

(22) Filed: Nov. 9, 2011

(65) Prior Publication Data

US 2012/0327520 A1 Dec. 27, 2012

(30) Foreign Application Priority Data

Jun. 22, 2011 (TW) .............................. 100121846 A

(51) Int. Cl.
*G02B 3/02* (2006.01)
*G02B 9/60* (2006.01)

(52) U.S. Cl.
USPC .......................................... 359/714; 359/763

(58) Field of Classification Search
USPC ........................... 348/340; 359/714, 763, 764
See application file for complete search history.

(56) References Cited

U.S. PATENT DOCUMENTS

| 7,355,801 | B2 |  | 4/2008 | Chen et al. |  |
|---|---|---|---|---|---|
| 7,826,151 | B2 | * | 11/2010 | Tsai | 359/764 |
| 7,864,454 | B1 | * | 1/2011 | Tang et al. | 359/764 |
| 8,233,224 | B2 | * | 7/2012 | Chen | 359/764 |
| 8,363,337 | B2 | * | 1/2013 | Tang et al. | 359/764 |
| 8,379,324 | B2 | * | 2/2013 | Tsai et al. | 359/714 |

* cited by examiner

*Primary Examiner* — David N Spector
(74) *Attorney, Agent, or Firm* — CKC & Partners Co., Ltd.

(57) ABSTRACT

An image capturing optical lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element with positive refractive power has a convex object-side surface and a concave image-side surface. The fourth lens element with positive refractive power is made of plastic material, and has a concave object-side surface and a convex image-side surface. The fifth lens element with refractive power is made of plastic material, and has a convex image-side surface. At least one of the object-side surface and the image-side surface of the third lens element, the fourth lens element and the fifth lens element are aspheric.

22 Claims, 14 Drawing Sheets

IMAGE CAPTURING OPTICAL LENS ASSEMBLY

RELATED APPLICATIONS

The application claims priority to Taiwan Application Serial Number 100121846, filed Jun. 22, 2011, which is herein incorporated by reference.

BACKGROUND

1. Technical Field

The present disclosure relates to an image capturing optical lens assembly. More particularly, the present disclosure relates to a compact image capturing optical lens assembly applicable to electronic products.

2. Description of Related Art

In recent years, with the popularity of mobile products with camera functionalities, the demand for compact image capturing optical lens assemblies is increasing. The sensor of a conventional photographing camera is typically a CCD (Charge-Coupled Device) image sensor or a CMOS (Complementary Metal-Oxide-Semiconductor) sensor. As advanced semiconductor manufacturing technologies have allowed the pixel size of sensors to be reduced and compact image capturing optical lens assemblies have gradually evolved toward the field of higher megapixels, there is an increasing demand for compact image capturing optical lens assemblies featuring better image quality.

A conventional compact image capturing optical lens assembly employed in a portable electronic product mainly adopts a four-element lens structure. Due to the popularity of mobile products with high specification, such as Smart Phones and PDAs (Personal Digital Assistants), the pixel and image-quality requirements of the compact image capturing optical lens assembly have increased rapidly. However, the conventional four-piece lens structure cannot satisfy the requirements of the compact image capturing optical lens assembly. Furthermore, the trend in modern electronics is developed toward increasingly higher performance and compact size. Therefore, a need exists in the art for providing a photographing lens assembly for use in a mobile electronic product that has excellent imaging quality without too long total track length.

SUMMARY

According to one aspect of the present disclosure, an image capturing optical lens assembly includes, in order from an object side to an image side, a first lens element, a second lens element, a third lens element, a fourth lens element and a fifth lens element. The first lens element with positive refractive power has a convex object-side surface. The second lens element has negative refractive power. The third lens element with positive refractive power has a convex object-side surface and a concave image-side surface, wherein at least one of the object-side surface and the image-side surface of the third lens element is aspheric. The fourth lens element with positive refractive power is made of plastic material, and has a concave object-side surface and a convex image-side surface, wherein at least one of the object-side surface and the image-side surface of the fourth lens element is aspheric. The fifth lens element with refractive power is made of plastic material, and has a convex image-side surface, wherein at least one of the object-side surface and the image-side surface of the fifth lens element is aspheric. When a focal length of the image capturing optical lens assembly is f, a focal length of the third lens element is f3, and a focal length of the fourth lens element is f4, the following relationships are satisfied:

$$0 < f/f3 < 1.2;$$

and $$0.3 < f4/f < 0.65.$$

According to another aspect of the present disclosure, an image capturing optical lens assembly includes five non-cemented lens elements, in order from an object side to an image side, a first lens element, a second lens element, a third lens element, a fourth lens element and a fifth lens element. The first lens element has positive refractive power. The second lens element has negative refractive power. The third lens element with positive refractive power has a convex object-side surface and a concave image-side surface, wherein at least one of the object-side surface and the image-side surface of the third lens element is aspheric. The fourth lens element with positive refractive power is made of plastic material, wherein at least one of the object-side surface and the image-side surface of the fourth lens element is aspheric. The fifth lens element with refractive power is made of plastic material, wherein at least one of the object-side surface and the image-side surface of the fifth lens element is aspheric. The image capturing optical lens assembly further includes a stop between an object and the second lens element. When a curvature radius of the object-side surface of the fifth lens element is R9, a curvature radius of the image-side surface of the fifth lens element is R10, a focal length of the fourth lens element is f4, and a focal length of the image capturing optical lens assembly is f, the following relationships are satisfied:

$$-3.0 < (R9+R10)/(R9-R10) < 0;$$

and $$0.3 < f4/f < 0.65.$$

According to yet another aspect of the present disclosure, an image capturing optical lens assembly includes five non-cemented lens elements, in order from an object side to an image side, a first lens element, a second lens element, a third lens element, a fourth lens element and a fifth lens element. The first lens element has positive refractive power. The second lens element has negative refractive power. The third lens element has positive refractive power, wherein at least one of the object-side surface and the image-side surface of the third lens element is aspheric. The fourth lens element with positive refractive power is made of plastic material, and has a concave object-side surface and a convex image-side surface, wherein at least one of the object-side surface and the image-side surface of the fourth lens element is aspheric. The fifth lens element with refractive power is made of plastic material, and has a concave object-side surface and a convex image-side surface, wherein at least one of the object-side surface and the image-side surface of the fifth lens element is aspheric, and the fifth lens element has at least one inflection point formed on at least one of the object-side surface and the image-side surface thereof. The image capturing optical lens assembly further includes a stop between an object and the second lens element. When an axial distance between the second lens element and the third lens element is T23, an axial distance between the third lens element and the fourth lens element is T34, a focal length of the image capturing optical lens assembly is f, and a focal length of the fourth lens element is f4, the following relationships are satisfied:

$0 < T23/T34 < 0.65$;

and $0.3 < f4/f < 0.65$.

DETAILED DESCRIPTION

Figure 1:
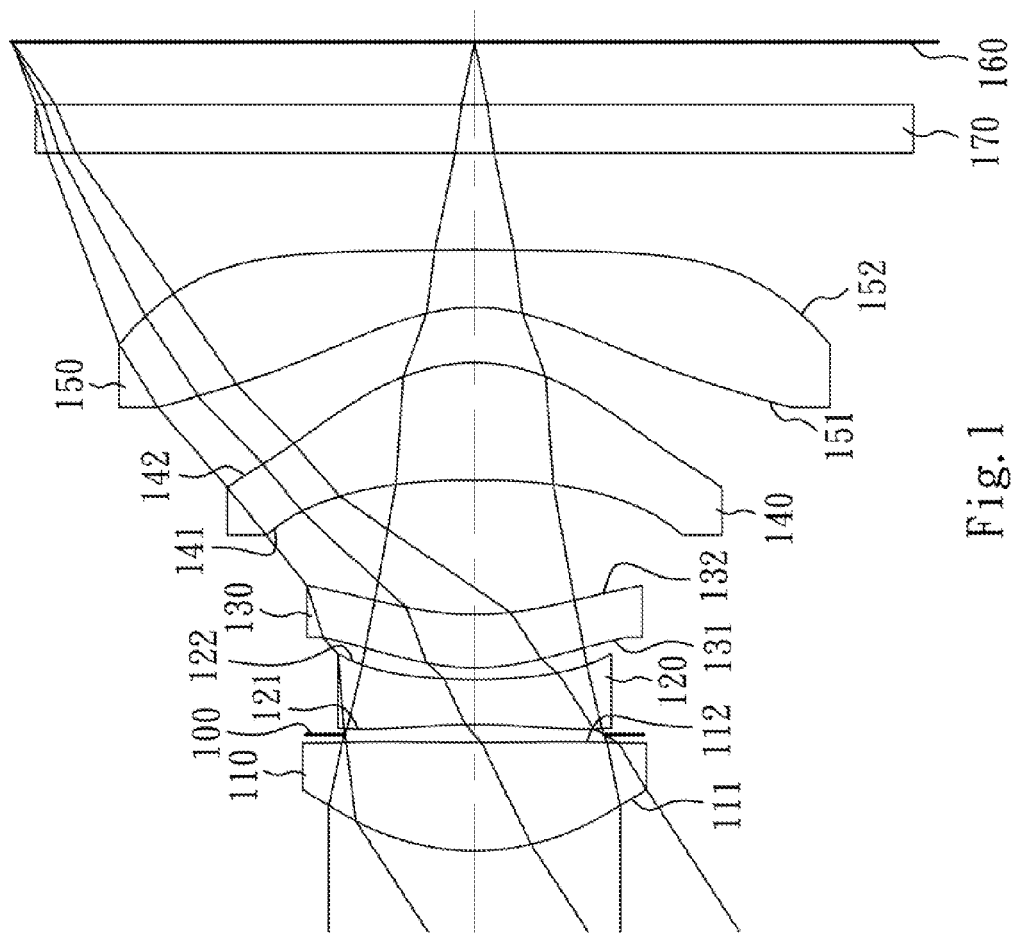
FIG. 1 is a schematic view of an image capturing optical lens assembly according to the first embodiment of the present disclosure.

An image capturing optical lens assembly includes, in order from an object side to an image side, a first lens element, a second lens element, a third lens element, a fourth lens element and a fifth lens element. The image capturing optical lens assembly further includes an image sensor located on the image plane. From the first lens element to the fifth lens element are five non-cemented lens elements. That is, any two lens elements adjacent to each other are not cemented, and there is an air space between the two lens elements. The manufacture of the cemented lenses is more complex than the manufacture of the non-cemented lenses. Especially, the cemented surfaces of the two lens elements should have accurate curvatures for ensuring the connection between the two lens elements, and the displacement between the cemented surfaces of the two lens elements during cementing the lens elements may affect the optical quality of the image capturing optical lens assembly. Therefore, the image capturing optical lens assembly of the present disclosure provides five non-cemented lens elements for improving the problem generated by the cemented lens elements.

The first lens element with positive refractive power provides partial refractive power for reducing the total track length of the image capturing optical lens assembly so as to maintain the compact size thereof. The first lens element can have a convex object-side surface, and a convex image-side surface or a concave image-side surface. When the first lens element has a convex object-side surface and a convex image-side surface, the refractive power of the first lens element can be enhanced for reducing the total track length thereof. When the first lens element has a convex object-side surface and a concave image-side surface, the astigmatism of the image capturing optical lens assembly can be corrected while retaining high image quality.

The second lens element with negative refractive power can correct the aberration generated from the first lens element with positive refractive power.

The third lens element with positive refractive power has a convex object-side surface and a concave image-side surface, and can correct the photosensitivity and the aberration of the image capturing optical lens assembly. Moreover, at least one of the object-side surface and the image-side surface of the third lens element is aspheric.

The fourth lens element is made of plastic material. The fourth lens element with positive refractive power provides main refractive power for reducing the total track length as well as the photosensitivity of the image capturing optical lens assembly. The fourth lens element has a concave object-side surface and a convex image-side surface, so that the astigmatism and the high order aberration of the image capturing optical lens assembly can be corrected. Moreover, at least one of the object-side surface and the image-side surface of the fourth lens element is aspheric.

The fifth lens element is made of plastic material. The fifth lens element with negative refractive power can correct the Petzval Sum of the image capturing optical lens assembly for smoothing the peripheral area of the image. The fifth lens element has a concave object-side surface and a convex image-side surface for reducing the total track length of the image capturing optical lens assembly. Moreover, at least one of the object-side surface and the image-side surface of the fifth lens element is aspheric, and the fifth lens element has at least one inflection point formed on at least one of the object-side surface and the image-side surface thereof. By the arrangement of the inflection point, the incident angle of the off-axis field of light on the image sensor can be effectively minimized and the aberration of the off-axis field can be corrected.

When a focal length of the image capturing optical lens assembly is f, and a focal length of the third lens element is f3, the following relationship is satisfied:

$0 < f/f3 < 1.2$.

Therefore, the refractive power of the third lens element can reduce the total track length of the image capturing optical lens assembly.

When the focal length of the image capturing optical lens assembly is f, and a focal length of the fourth lens element is f4, the following relationship is satisfied:

$0.3 < f4/f < 0.65$.

Therefore, the refractive power of the fourth lens element can correct the aberration and the photosensitivity of the image capturing optical lens assembly.

When the Abbe number of the first lens element is V1, and the Abbe number of the second lens element is V2, the following relationship is satisfied:

$$28<V1-V2<45.$$

Therefore, the chromatic aberration of the image capturing optical lens assembly can be corrected.

When a curvature radius of the object-side surface of the fifth lens element is R9, and a curvature radius of the image-side surface of the fifth lens element is R10, the following relationship is satisfied:

$$-3.0<(R9+R10)/(R9-R10)<0.$$

Therefore, the total track length of the image capturing optical lens assembly can be reduced.

R9 and R10 can further satisfy the following relationship:

$$-3.0<(R9+R10)/(R9-R10)<-1.0.$$

When a focal length of the first lens element is f1, and a focal length of the second lens element is f2, the following relationship is satisfied:

$$-1.3<f1/f2<-0.6.$$

Therefore, the refractive power of the first lens element and the second lens element can correct the chromatic aberration and the aberration of the image capturing optical lens assembly.

When an axial distance between the second lens element and the third lens element is T23, and an axial distance between the third lens element and the fourth lens element is T34, the following relationship is satisfied:

$$0<T23/T34<0.65.$$

Therefore, the fabrication of the lens elements can be easier due to the position of the third lens element.

T23 and T34 can further satisfy the following relationship:

$$0<T23/T34<0.5.$$

The image capturing optical lens assembly further includes a stop, such as an aperture stop, which can be positioned between the object and the second lens element. When the stop is located between the first lens element and the second lens element, an axial distance between the stop and the image-side surface of the fifth lens element is SD, and an axial distance between the object-side surface of the first lens element and the image-side surface of the fifth lens element is TD, the following relationship is satisfied:

$$0.7<SD/TD<0.9.$$

If SD/TD<0.7, this would result in the angle of incidence on the image sensor being too large, which would cause poor photographic performance of the image sensor as well as excessive chromatic aberration within the image capturing optical lens assembly. If SD/TD>0.9, this would result in the total track length of the image capturing optical lens assembly being too long. Therefore, when SD/TD satisfies the above relationship, the image capturing optical lens assembly has the telecentric and wide-angle characteristic, and a desirable total track length of the image capturing optical lens assembly can be maintained.

When a maximum image height of the image capturing optical lens assembly is ImgH, and an axial distance between the object-side surface of the first lens element and the image plane is TTL, the following relationship is satisfied:

$$TTL/ImgH<2.00.$$

Therefore, the total track length of the image capturing optical lens assembly can be reduced, so as to maintain the compact size of the image capturing optical lens assembly. As a result, the image capturing optical lens assembly may be employed in lightweight and portable electronic products.

According to the image capturing optical lens assembly of the present disclosure, the lens element can be made of glass material or plastic material. When the lens element is made of glass material, there is a higher degree of freedom in setting the parameters in distribution of the refractive power of the image capturing lens assembly. When the lens element is made of plastic material, the cost of manufacture can be effectively reduced. Moreover, the surface of the lens element can be aspheric, so that it is easier to make the surface into other non-spherical shapes. As a result, more controllable variables are obtained, while reducing the aberration and the number of required lens elements. Therefore, the total track length of the image capturing optical lens assembly can also be reduced.

According to the image capturing optical lens assembly of the present disclosure, when the lens element has a convex surface, it indicates that the paraxial region of the surface is convex, and when the lens element has a concave surface, it indicates that the paraxial region of the surface is concave.

According to the image capturing optical lens assembly of the present disclosure, the image capturing optical lens assembly can include at least one stop for reducing stray light or other functionalities. Furthermore, when the stop is an aperture stop, the position of the aperture stop can be arbitrarily placed in front of the entire optical system or within the optical system according to the preference of the designer, in order to achieve the desirable optical features or higher image quality produced from the optical system.

According to the above description of the present disclosure, the following 1st-7th specific embodiments are provided for further explanation.

Figure 2:
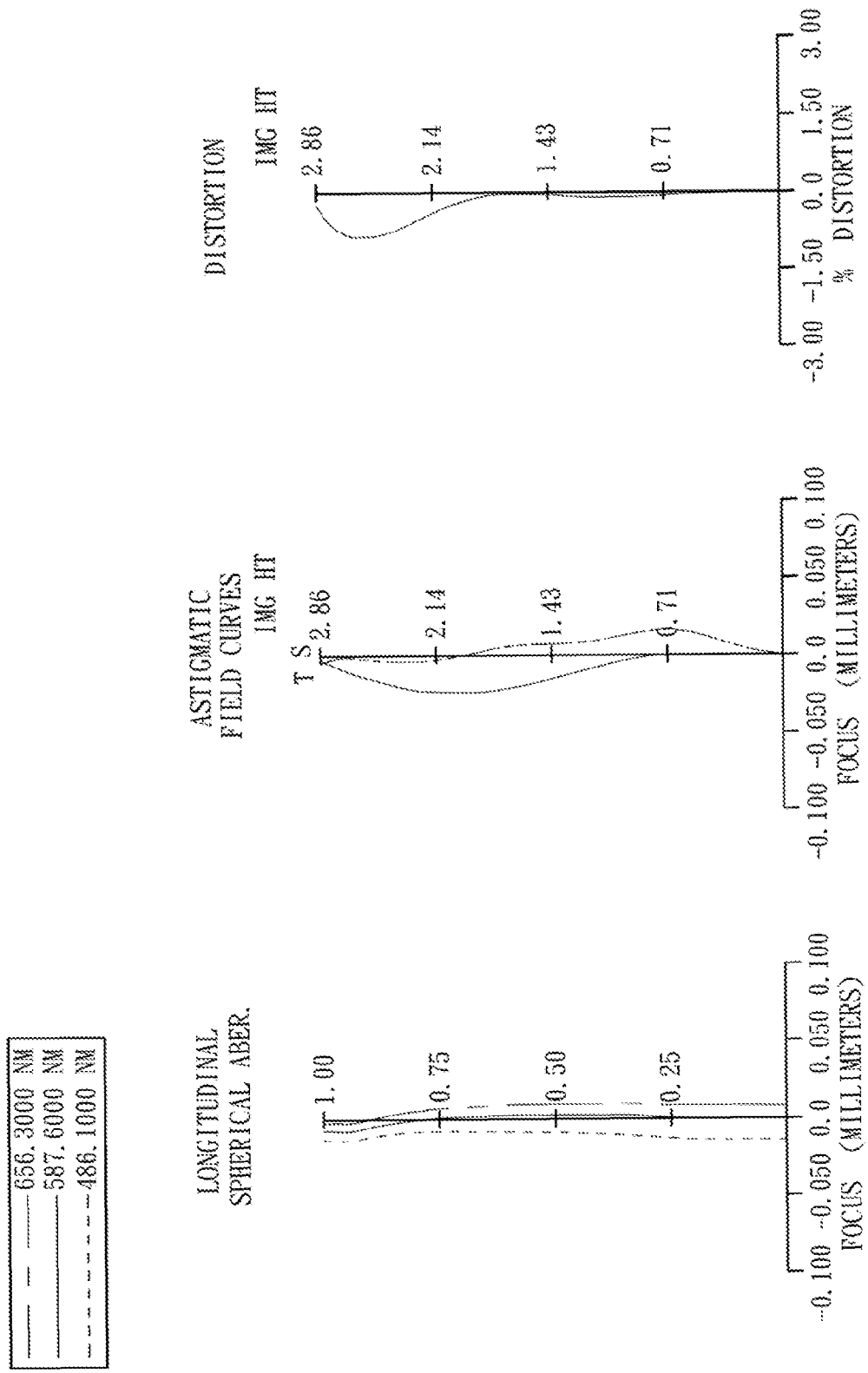
FIG. 2 shows spherical aberration curves, astigmatic field curves and a distortion curve of the image capturing optical lens assembly according to the first embodiment.

FIG. 1 is a schematic view of an image capturing optical lens assembly according to the first embodiment of the present disclosure. FIG. 2 shows spherical aberration curves, astigmatic field curves and a distortion curve of the image capturing optical lens assembly according to the first embodiment. In FIG. 1, the image capturing optical lens assembly includes, in order from an object side to an image side, the first lens element 110, an aperture stop 100, the second lens element 120, the third lens element 130, the fourth lens element 140, the fifth lens element 150, a cover glass 170 and an image plane 160.

The first lens element 110 with positive refractive power has a convex object-side surface 111 and a concave image-side surface 112, and is made of plastic material. The object-side surface 111 and the image-side surface 112 of the first lens element 110 are aspheric.

The second lens element 120 with negative refractive power has a concave object-side surface 121 and a concave image-side surface 122, and is made of plastic material. The object-side surface 121 and the image-side surface 122 of the second lens element 120 are aspheric.

The third lens element 130 with positive refractive power has a convex object-side surface 131 and a concave image-side surface 132, and is made of plastic material. The object-side surface 131 and the image-side surface 132 of the third lens element 130 are aspheric.

The fourth lens element 140 with positive refractive power has a concave object-side surface 141 and a convex image-side surface 142, and is made of plastic material. The object-side surface 141 and the image-side surface 142 of the fourth lens element 140 are aspheric.

The fifth lens element 150 with negative refractive power has a concave object-side surface 151 and a convex image-side surface 152, and is made of plastic material. The object-side surface 151 and the image-side surface 152 of the fifth lens element 150 are aspheric. Moreover, the fifth lens element 150 has inflection points formed on the object-side surface 151 thereof.

The cover glass 170 is located between the fifth lens element 150 and the image plane 160, and will not affect the focal length of the image capturing optical lens assembly.

The equation of the aspheric surface profiles of the aforementioned lens elements of the first embodiment is expressed as the following:

$$X(Y) = \frac{(Y^2/R)}{(1 + sqrt(1 - (1+k) \times (Y/R)^2)) + \sum_i (Ai) \times (Y^i)}$$

where:

X is the height of a point on the aspheric surface spaced at a distance Y from the optical axis relative to the tangential plane at the aspheric surface vertex;

Y is the distance from the point on the curve of the aspheric surface to the optical axis;

R is the curvature radius of the surface of the lens element;

k is the conic coefficient; and

Ai is the i-th aspheric coefficient.

In the image capturing optical lens assembly according to the first embodiment, when f is a focal length of the image capturing optical lens assembly, Fno is an f-number of the image capturing optical lens assembly, and HFOV is half of the maximal field of view, these parameters have the following values:

f=4.40 mm;

Fno=2.45; and

HFOV=33.1 degrees.

In the image capturing optical lens assembly according to the first embodiment, when the Abbe number of the first lens element 110 is V1, and the Abbe number of the second lens element 120 is V2, the following relationship is satisfied:

$V1-V2=32.1$.

In the image capturing optical lens assembly according to the first embodiment, when the focal length of the image capturing optical lens assembly is f, a focal length of the first lens element 110 is f1, a focal length of the second lens element 120 is f2, a focal length of the third lens element 130 is f3, and a focal length of the fourth lens element 140 is f4, the following relationships are satisfied:

$f/f3=0.82$;

$f4/f=0.53$;

and $f1/f2=-1.10$.

In the image capturing optical lens assembly according to the first embodiment, when a curvature radius of the object-side surface 151 of the fifth lens element 150 is R9, and a curvature radius of the image-side surface 152 of the fifth lens element 150 is R10, the following relationship is satisfied:

$(R9+R10)/(R9-R10)=-1.10$.

In the image capturing optical lens assembly according to the first embodiment, when an axial distance between the second lens element 120 and the third lens element 130 is T23, and an axial distance between the third lens element 130 and the fourth lens element 140 is T34, the following relationship is satisfied:

$T23/T34=0.09$.

In the image capturing optical lens assembly according to the first embodiment, when an axial distance between the stop 100 and the image-side surface 152 of the fifth lens element 150 is SD, and an axial distance between the object-side surface 111 of the first lens element 110 and the image-side surface 152 of the fifth lens element 150 is TD, the following relationship is satisfied:

$SD/TD=0.81$.

In the image capturing optical lens assembly according to the first embodiment, when a maximum image height of the image capturing optical lens assembly is ImgH, which here is half of a diagonal length of an effective photosensitive area of the image sensor, and the axial distance between the object-side surface 111 of the first lens element 110 and the image plane 160 is TTL, the following relationship is satisfied:

$TTL/ImgH=1.71$.

The detailed optical data of the first embodiment are shown in Table 1 and the aspheric surface data are shown in Table 2 below.

TABLE 1

1st Embodiment
f = 4.40 mm, Fno = 2.45, HFOV = 33.1 deg.

| Surface # |           | Curvature Radius   | Thickness | Material | Index | Abbe # | Focal length |
|-----------|-----------|--------------------|-----------|----------|-------|--------|--------------|
| 0         | Object    | Plano              | Infinity  |          |       |        |              |
| 1         | Lens 1    | 1.519040 (ASP)     | 0.669     | Plastic  | 1.544 | 55.9   | 2.82         |
| 2         |           | 118.960000 (ASP)   | 0.047     |          |       |        |              |
| 3         | Ape. Stop | Plano              | 0.063     |          |       |        |              |
| 4         | Lens 2    | −3.290700 (ASP)    | 0.280     | Plastic  | 1.634 | 23.8   | −2.57        |
| 5         |           | 3.345900 (ASP)     | 0.073     |          |       |        |              |
| 6         | Lens 3    | 1.315850 (ASP)     | 0.327     | Plastic  | 1.634 | 23.8   | 5.37         |
| 7         |           | 1.937010 (ASP)     | 0.827     |          |       |        |              |
| 8         | Lens 4    | −5.492800 (ASP)    | 0.725     | Plastic  | 1.544 | 55.9   | 2.33         |
| 9         |           | −1.077810 (ASP)    | 0.345     |          |       |        |              |
| 10        | Lens 5    | −1.115940 (ASP)    | 0.350     | Plastic  | 1.535 | 56.3   | −2.20        |
| 11        |           | −24.254200 (ASP)   | 0.600     |          |       |        |              |
| 12        | Cover-Glass | Plano            | 0.300     | Glass    | 1.517 | 64.2   | —            |
| 13        |           | Plano              | 0.384     |          |       |        |              |
| 14        | Image     | Plano              | —         |          |       |        |              |

Note:
Reference wavelength (d-line) is 587.6 nm.

TABLE 2

Aspheric Coefficients

| | Surface # | | | | |
|---|---|---|---|---|---|
| | 1 | 2 | 4 | 5 | 6 |
| k = | −6.92979E−01 | −1.00000E+00 | −5.12353E+01 | −9.00000E+01 | −1.03531E+01 |
| A4 = | 1.63664E−02 | 3.91764E−02 | 1.61879E−01 | 2.29029E−01 | 7.26139E−01 |
| A6 = | 9.69131E−03 | −1.08401E−01 | −1.79929E−01 | −1.09121E−01 | −1.67768E−01 |
| A8 = | −3.27472E−02 | 9.52113E−02 | 1.71390E−01 | 5.53679E−02 | 8.25100E−02 |
| A10 = | 3.55548E−02 | −6.36050E−02 | −7.09950E−02 | 1.14105E−01 | −5.76498E−04 |
| A12 = | −2.56738E−02 | 1.58312E−02 | 1.15627E−02 | −6.75654E−02 | |

| | Surface # | | | | |
|---|---|---|---|---|---|
| | 7 | 8 | 9 | 10 | 11 |
| k = | −6.13281E+00 | −2.86502E+00 | −8.27678E−01 | −2.22242E+00 | −1.00000E+00 |
| A4 = | 2.87972E−03 | −9.49120E−02 | 8.02609E−02 | 9.45058E−02 | 1.02039E−02 |
| A6 = | −3.55527E−02 | 1.70602E−02 | −4.16551E−02 | −3.37171E−02 | −1.46765E−02 |
| A8 = | −2.84764E−02 | 1.83698E−02 | 3.83033E−02 | 6.94329E−03 | 3.03132E−03 |
| A10 = | 2.79156E−02 | −1.19666E−02 | −8.60525E−03 | −7.22666E−04 | −2.76994E−04 |
| A12 = | 1.23882E−02 | −7.81230E−04 | −2.83084E−04 | 2.24934E−05 | −1.92890E−05 |
| A14 = | −1.12346E−02 | 5.12320E−04 | 5.79988E−05 | −8.50653E−08 | 4.01424E−06 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 also applies to the Tables for the rest of embodiments, and thus an explanation in this regard will not be provided again.

Figure 3:
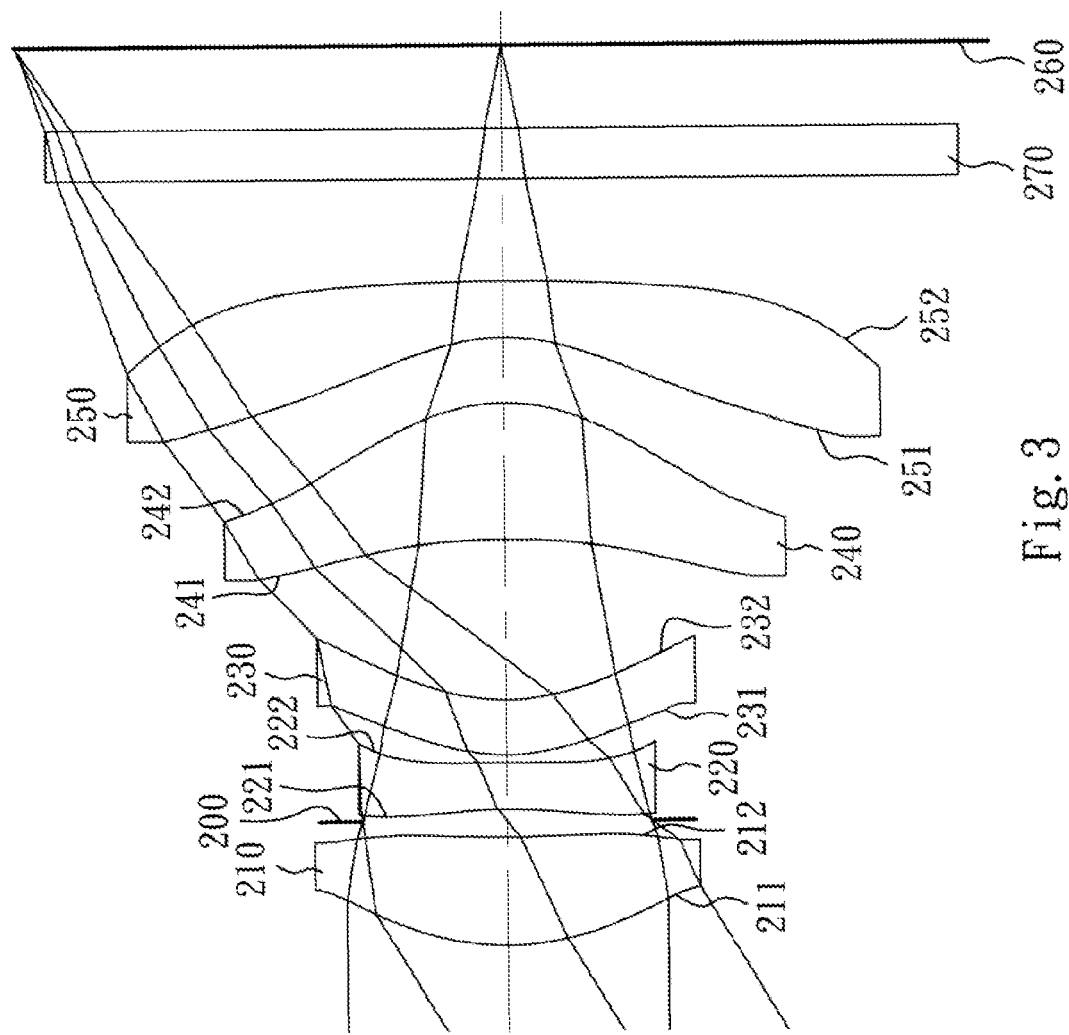
FIG. 3 is a schematic view of an image capturing optical lens assembly according to the second embodiment of the present disclosure.
Figure 4:
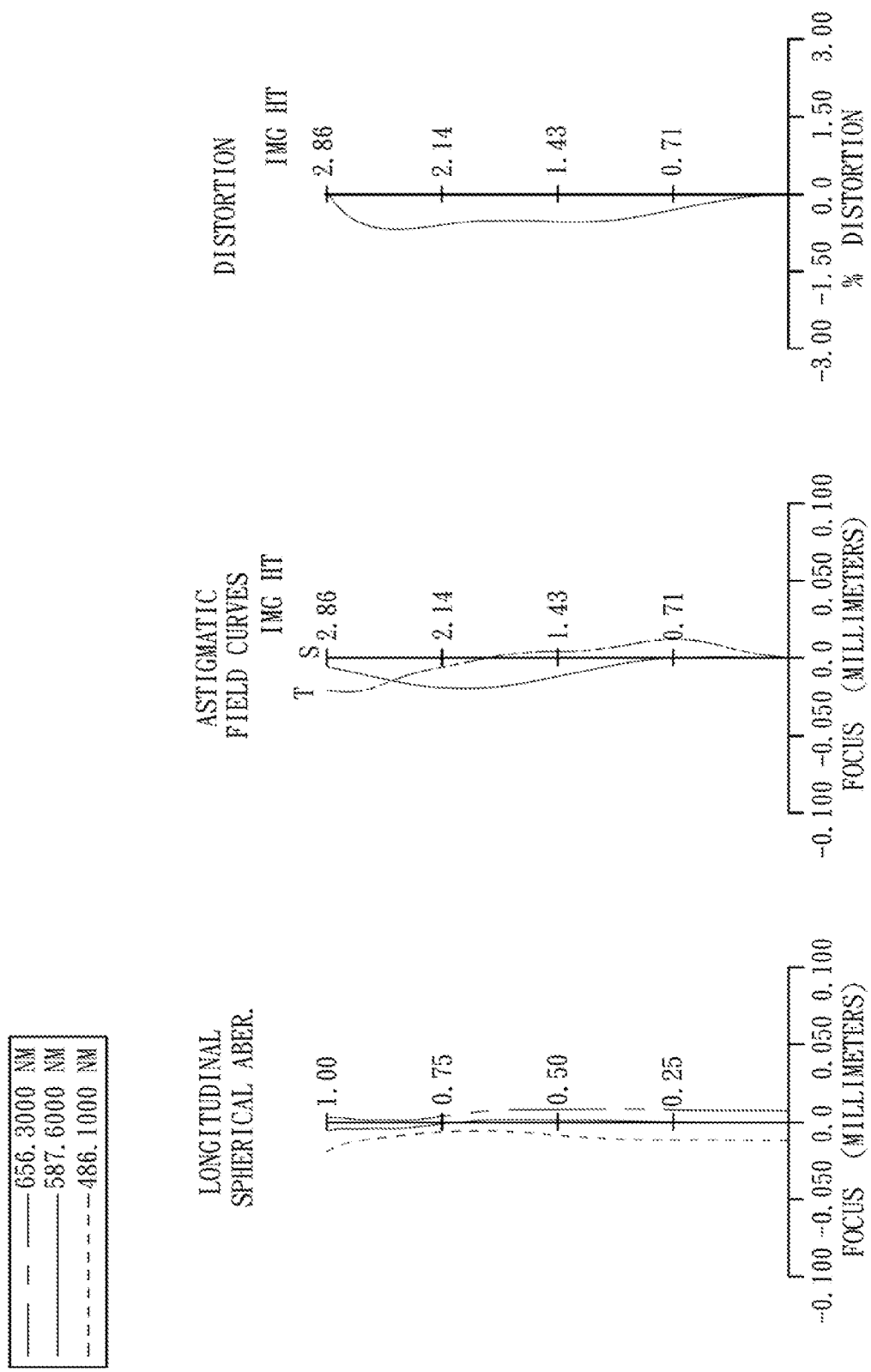
FIG. 4 shows spherical aberration curves, astigmatic field curves and a distortion curve of the image capturing optical lens assembly according to the second embodiment.

FIG. 3 is a schematic view of an image capturing optical lens assembly according to the second embodiment of the present disclosure. FIG. 4 shows spherical aberration curves, astigmatic field curves and a distortion curve of the image capturing optical lens assembly according to the second embodiment. In FIG. 3, the image capturing optical lens assembly includes, in order from an object side to an image side, the first lens element 210, an aperture stop 200, the second lens element 220, the third lens element 230, the fourth lens element 240, the fifth lens element 250, a cover glass 270 and an image plane 260.

The first lens element 210 with positive refractive power has a convex object-side surface 211 and a concave image-side surface 212, and is made of plastic material. The object-side surface 211 and the image-side surface 212 of the first lens element 210 are aspheric.

The second lens element 220 with negative refractive power has a concave object-side surface 221 and a convex image-side surface 222, and is made of plastic material. The object-side surface 221 and the image-side surface 222 of the second lens element 220 are aspheric.

The third lens element 230 with positive refractive power has a convex object-side surface 231 and a concave image-side surface 232, and is made of plastic material. The object-side surface 231 and the image-side surface 232 of the third lens element 230 are aspheric.

The fourth lens element 240 with positive refractive power has a concave object-side surface 241 and a convex image-side surface 242, and is made of plastic material. The object-side surface 241 and the image-side surface 242 of the fourth lens element 240 are aspheric.

The fifth lens element 250 with negative refractive power has a concave object-side surface 251 and a convex image-side surface 252, and is made of plastic material. The object-side surface 251 and the image-side surface 252 of the fifth lens element 250 are aspheric. Moreover, the fifth lens element 250 has inflection points formed on the object-side surface 251 thereof.

The cover glass 270 is located between the fifth lens element 250 and the image plane 260, and will not affect the focal length of the image capturing optical lens assembly.

The equation of the aspheric surface profiles of the above lens elements of the second embodiment is the same as that of the first embodiment, and will not be stated herein again.

In the image capturing optical lens assembly according to the second embodiment, the definitions of f, Fno, HFOV, V1, V2, f1, f2, f3, f4, R9, R10, T23, T34, SD, TD, TTL and ImgH are the same as those stated in the first embodiment with corresponding values for the second embodiment. Moreover, these parameters have the following values and satisfy the following relationships:

| f(mm) | 4.71 | f1/f2 | −0.70 |
|---|---|---|---|
| Fno | 2.50 | (R9 + R10)/(R9 − R10) | −1.24 |
| HFOV(deg.) | 31.3 | T23/T34 | 0.05 |
| V1 − V2 | 32.1 | SD/TD | 0.81 |
| f/f3 | 0.34 | TTL/ImgH | 1.81 |
| f4/f | 0.53 | | |

The detailed optical data of the second embodiment are shown in Table 3 and the aspheric surface data are shown in Table 4 below.

TABLE 3

2nd Embodiment
f = 4.71 mm, Fno = 2.50, HFOV = 31.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.600710 (ASP) | 0.639 | Plastic | 1.544 | 55.9 | 3.63 |
| 2 | | 7.258000 (ASP) | 0.094 | | | | |
| 3 | Ape. Stop | Plano | 0.068 | | | | |
| 4 | Lens 2 | −2.767940 (ASP) | 0.270 | Plastic | 1.634 | 23.8 | −5.20 |
| 5 | | −17.962300 (ASP) | 0.046 | | | | |
| 6 | Lens 3 | 1.165350 (ASP) | 0.327 | Plastic | 1.544 | 55.9 | 13.94 |
| 7 | | 1.240700 (ASP) | 0.937 | | | | |
| 8 | Lens 4 | −5.310600 (ASP) | 0.801 | Plastic | 1.544 | 55.9 | 2.49 |
| 9 | | −1.138110 (ASP) | 0.387 | | | | |
| 10 | Lens 5 | −1.158020 (ASP) | 0.330 | Plastic | 1.544 | 55.9 | −2.41 |
| 11 | | −10.729600 (ASP) | 0.600 | | | | |
| 12 | Cover-Glass | Plano | 0.300 | Glass | 1.517 | 64.2 | — |
| 13 | | Plano | 0.484 | | | | |
| 14 | Image | Plano | — | | | | |

Note:
Reference wavelength (d-line) is 587.6 nm.

TABLE 4

Aspheric Coefficients

| | Surface # | | | | |
|---|---|---|---|---|---|
| | 1 | 2 | 4 | 5 | 6 |
| k = | −9.00023E−01 | −6.75424E+01 | −4.28943E+01 | −1.00000E+00 | −6.10502E+00 |
| A4 = | 9.78877E−03 | −6.73365E−02 | 1.05680E−01 | 2.46695E−01 | 1.05143E−01 |
| A6 = | −7.66527E−03 | −7.53313E−02 | −9.14044E−02 | −3.38592E−02 | −1.48540E−01 |
| A8 = | −1.65340E−02 | 1.21066E−01 | 1.92684E−01 | 3.95777E−02 | 7.79783E−02 |
| A10 = | 1.58617E−02 | −5.75439E−02 | −1.58917E−01 | 6.49619E−03 | −1.60768E−02 |
| A12 = | −3.53858E−02 | −1.08275E−02 | 8.01543E−02 | 3.23828E−03 | |
| A14 = | 1.38294E−02 | 1.09016E−02 | −1.51031E−02 | 5.90004E−08 | |

| | Surface # | | | | |
|---|---|---|---|---|---|
| | 7 | 8 | 9 | 10 | 11 |
| k = | −4.29462E+00 | 2.18281E+00 | −8.40932E−01 | −2.28476E+00 | −1.00000E+00 |
| A4 = | 6.76585E−02 | −6.28606E−02 | 7.77123E−02 | 9.97465E−02 | 2.15187E−02 |
| A6 = | −5.72895E−02 | 3.21617E−02 | −2.54203E−02 | −3.51022E−02 | −1.65993E−02 |
| A8 = | −1.11928E−02 | 1.23837E−02 | 3.04279E−02 | 6.53121E−03 | 3.40106E−03 |
| A10 = | 3.63719E−02 | −1.07833E−02 | −8.71589E−03 | −6.56417E−04 | −3.05098E−04 |
| A12 = | −1.70218E−02 | 1.87855E−03 | 6.96299E−05 | 4.42306E−05 | −1.97414E−05 |
| A14 = | 2.18399E−03 | 2.85031E−05 | 1.53274E−04 | −2.97078E−06 | 4.39164E−06 |

Figure 5:
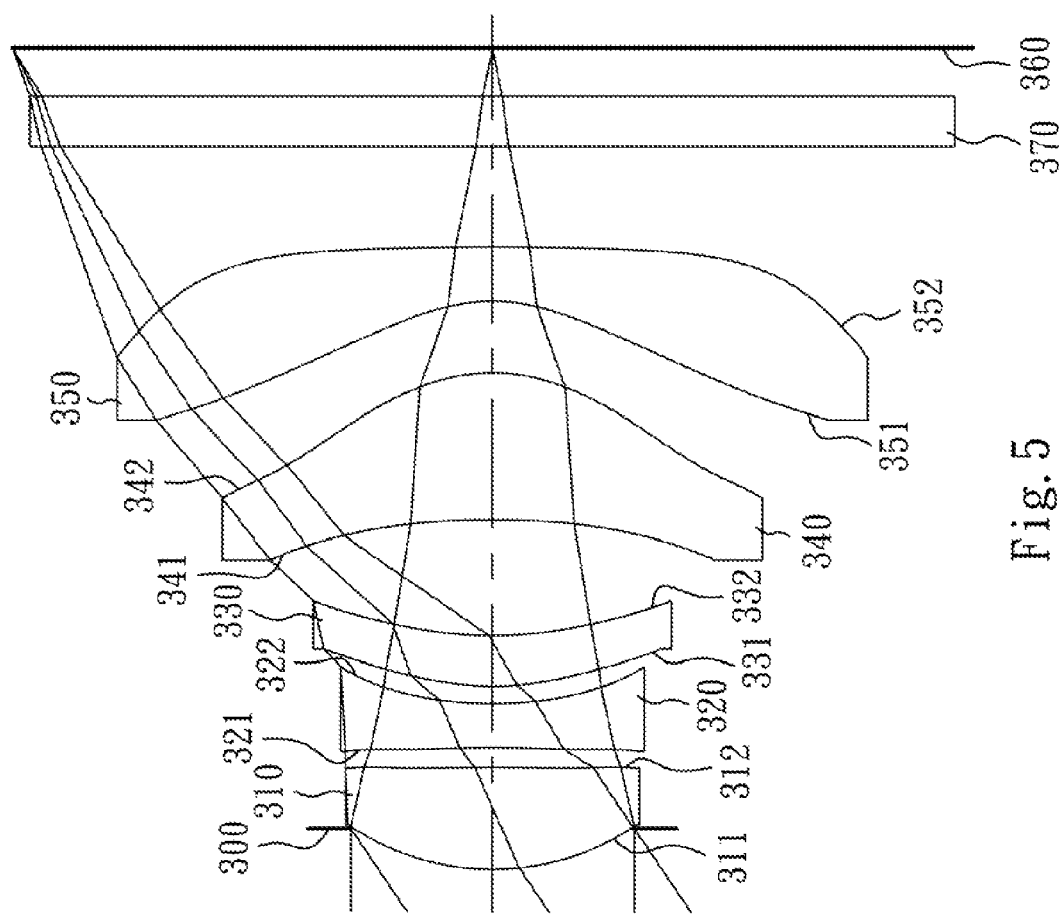
FIG. 5 is a schematic view of an image capturing optical lens assembly according to the third embodiment of the present disclosure.
Figure 6:
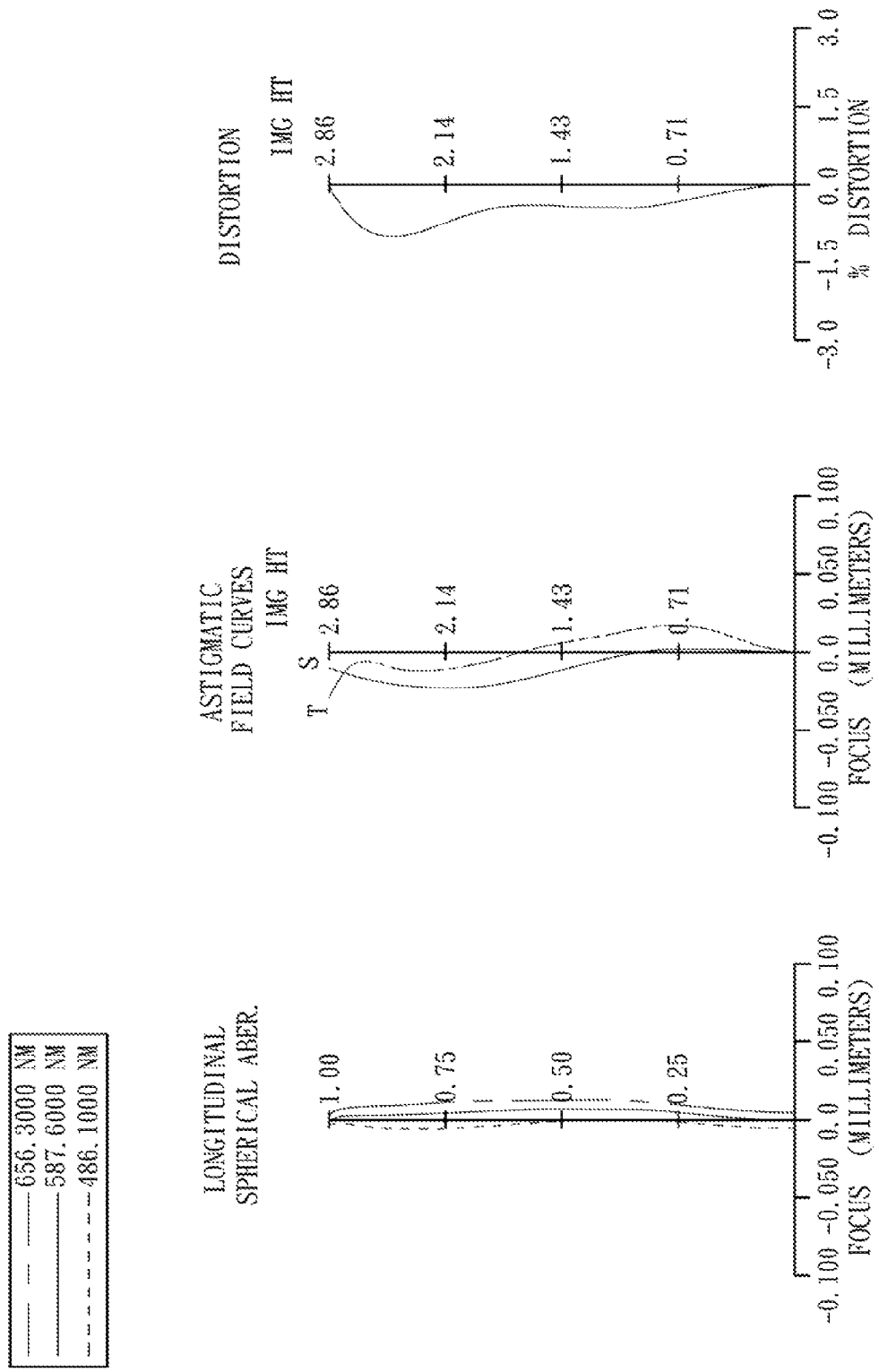
FIG. 6 shows spherical aberration curves, astigmatic field curves and a distortion curve of the image capturing optical lens assembly according to the third embodiment.

FIG. 5 is a schematic view of an image capturing optical lens assembly according to the third embodiment of the present disclosure. FIG. 6 shows spherical aberration curves, astigmatic field curves and a distortion curve of the image capturing optical lens assembly according to the third embodiment. In FIG. 5, the image capturing optical lens assembly includes, in order from an object side to an image side, an aperture stop 300, the first lens element 310, the second lens element 320, the third lens element 330, the fourth lens element 340, the fifth lens element 350, a cover glass 370 and an image plane 360.

The first lens element 310 with positive refractive power has a convex object-side surface 311 and a convex image-side surface 312, and is made of plastic material. The object-side surface 311 and the image-side surface 312 of the first lens element 310 are aspheric.

The second lens element 320 with negative refractive power has a concave object-side surface 321 and a concave image-side surface 322, and is made of plastic material. The object-side surface 321 and the image-side surface 322 of the second lens element 320 are aspheric.

The third lens element 330 with positive refractive power has a convex object-side surface 331 and a concave image-side surface 332, and is made of plastic material. The object-side surface 331 and the image-side surface 332 of the third lens element 330 are aspheric.

The fourth lens element 340 with positive refractive power has a concave object-side surface 341 and a convex image-side surface 342, and is made of plastic material. The object-side surface 341 and the image-side surface 342 of the fourth lens element 340 are aspheric.

The fifth lens element 350 with negative refractive power has a concave object-side surface 351 and a convex image-side surface 352, and is made of plastic material. The object-side surface 351 and the image-side surface 352 of the fifth lens element 350 are aspheric. Moreover, the fifth lens element 350 has inflection points formed on the object-side surface 351 thereof.

The cover glass 370 is located between the fifth lens element 350 and the image plane 360, and will not affect the focal length of the image capturing optical lens assembly.

The equation of the aspheric surface profiles of the above lens elements of the third embodiment is the same as that of the first embodiment, and will not be stated herein again.

In the image capturing optical lens assembly according to the third embodiment, the definitions of f, Fno, HFOV, V1, V2, f1, f2, f3, f4, R9, R10, T23, T34, SD, TD, TTL and ImgH are the same as those stated in the first embodiment with corresponding values for the third embodiment. Moreover, these parameters have the following values and satisfy the following relationships:

| f(mm) | 4.22 | f1/f2 | −1.03 |
|---|---|---|---|
| Fno | 2.50 | (R9 + R10)/(R9 − R10) | −1.14 |
| HFOV(deg.) | 34.1 | T23/T34 | 0.15 |
| V1 − V2 | 32.1 | SD/TD | 0.93 |
| f/f3 | 0.62 | TTL/ImgH | 1.68 |
| f4/f | 0.54 | | |

The detailed optical data of the third embodiment are shown in Table 5 and the aspheric surface data are shown in Table 6 below.

TABLE 5

3rd Embodiment
f = 4.22 mm, Fno = 2.50, HFOV = 34.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.244 | | | | |
| 2 | Lens 1 | 1.532120 (ASP) | 0.608 | Plastic | 1.544 | 55.9 | 2.59 |
| 3 | | −14.858800 (ASP) | 0.118 | | | | |
| 4 | Lens 2 | −5.518200 (ASP) | 0.265 | Plastic | 1.634 | 23.8 | −2.52 |
| 5 | | 2.293370 (ASP) | 0.104 | | | | |
| 6 | Lens 3 | 1.593220 (ASP) | 0.299 | Plastic | 1.634 | 23.8 | 6.80 |
| 7 | | 2.342150 (ASP) | 0.690 | | | | |
| 8 | Lens 4 | −6.166000 (ASP) | 0.877 | Plastic | 1.544 | 55.9 | 2.27 |
| 9 | | −1.082080 (ASP) | 0.431 | | | | |
| 10 | Lens 5 | −1.043860 (ASP) | 0.320 | Plastic | 1.535 | 56.3 | −2.11 |
| 11 | | −15.748000 (ASP) | 0.600 | | | | |
| 12 | Cover-Glass | Plano | 0.300 | Glass | 1.517 | 64.2 | — |
| 13 | | Plano | 0.287 | | | | |
| 14 | Image | Plano | — | | | | |

Note:
Reference wavelength (d-line) is 587.6 nm.

TABLE 6

Aspheric Coefficients

| | Surface # | | | | |
|---|---|---|---|---|---|
| | 2 | 3 | 4 | 5 | 6 |
| k = | −5.32692E−01 | −1.00000E+00 | −5.22131E+01 | −2.91791E+01 | −1.28702E+01 |
| A4 = | 2.07819E−02 | 1.14874E−01 | 2.00311E−01 | 2.35787E−01 | 7.86979E−02 |
| A6 = | 2.02691E−02 | −8.36693E−02 | −1.97508E−01 | −1.30128E−01 | −1.09142E−01 |
| A8 = | −2.43208E−02 | 3.50301E−02 | 5.34796E−02 | 3.22676E−02 | 8.14214E−02 |
| A10 = | 4.98362E−02 | −1.17136E−01 | −8.67911E−02 | 2.37431E−02 | −1.74749E−02 |
| A12 = | −3.74048E−02 | 7.05222E−02 | 5.15597E−02 | −2.05606E−02 | −1.06986E−03 |
| A14 = | −1.30330E−03 | −2.77194E−02 | −1.04289E−02 | 3.12333E−02 | −7.07391E−06 |

| | Surface # | | | | |
|---|---|---|---|---|---|
| | 7 | 8 | 9 | 10 | 11 |
| k = | −1.14269E+01 | −1.09838E+01 | −8.34184E−01 | −2.43008E+00 | −1.00000E+00 |
| A4 = | 3.84993E−02 | −8.13747E−02 | 8.33686E−02 | 8.05382E−02 | 2.19409E−02 |
| A6 = | −1.81995E−02 | 4.02602E−02 | −3.52014E−02 | −3.32655E−02 | −1.97039E−02 |
| A8 = | −2.59908E−02 | 8.04873E−03 | 3.64187E−02 | 7.37456E−03 | 4.06189E−03 |
| A10 = | 2.83792E−02 | −1.32145E−02 | −9.02731E−03 | −6.83008E−04 | −3.56281E−04 |
| A12 = | 1.34640E−02 | 2.65699E−04 | −1.03096E−04 | 1.53919E−05 | −2.84646E−05 |
| A14 = | −1.20220E−02 | 1.20841E−03 | 1.04648E−04 | −1.59129E−06 | 5.53045E−06 |

Figure 7:
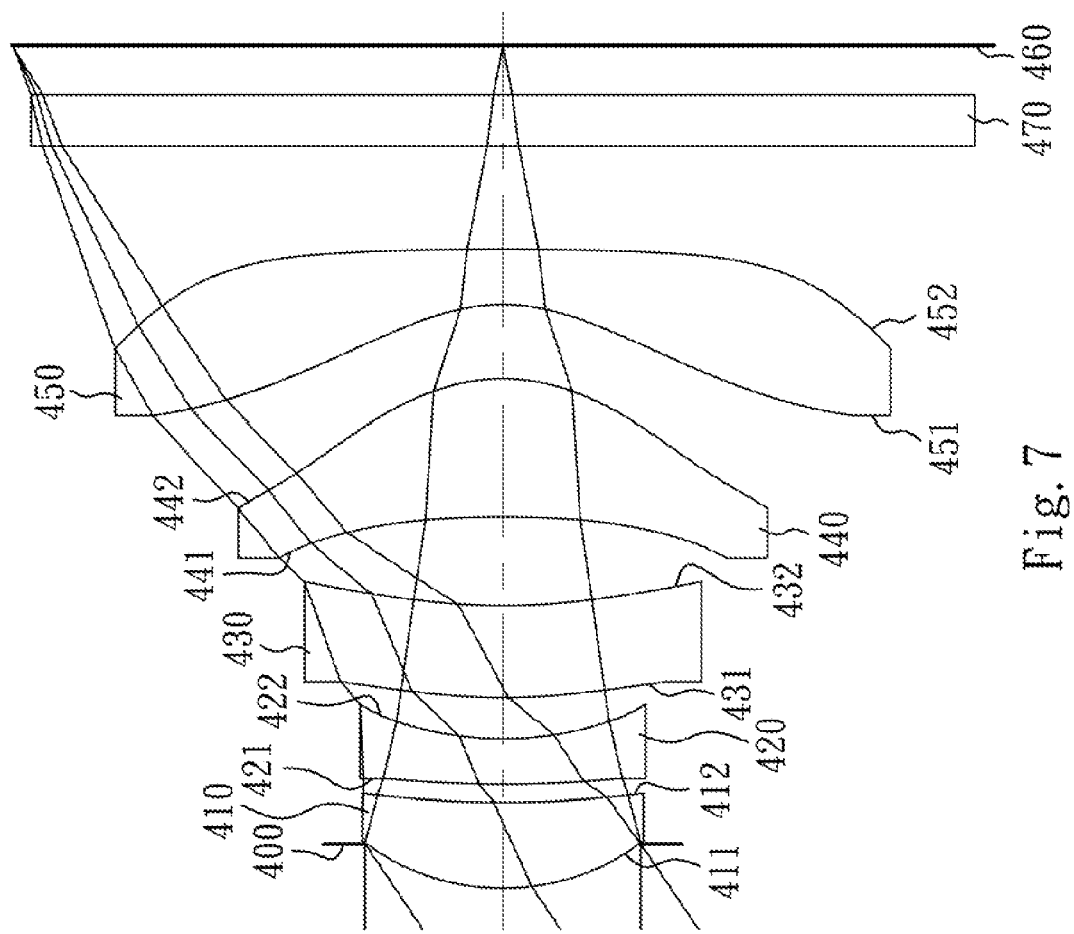
FIG. 7 is a schematic view of an image capturing optical lens assembly according to the fourth embodiment of the present disclosure.
Figure 8:
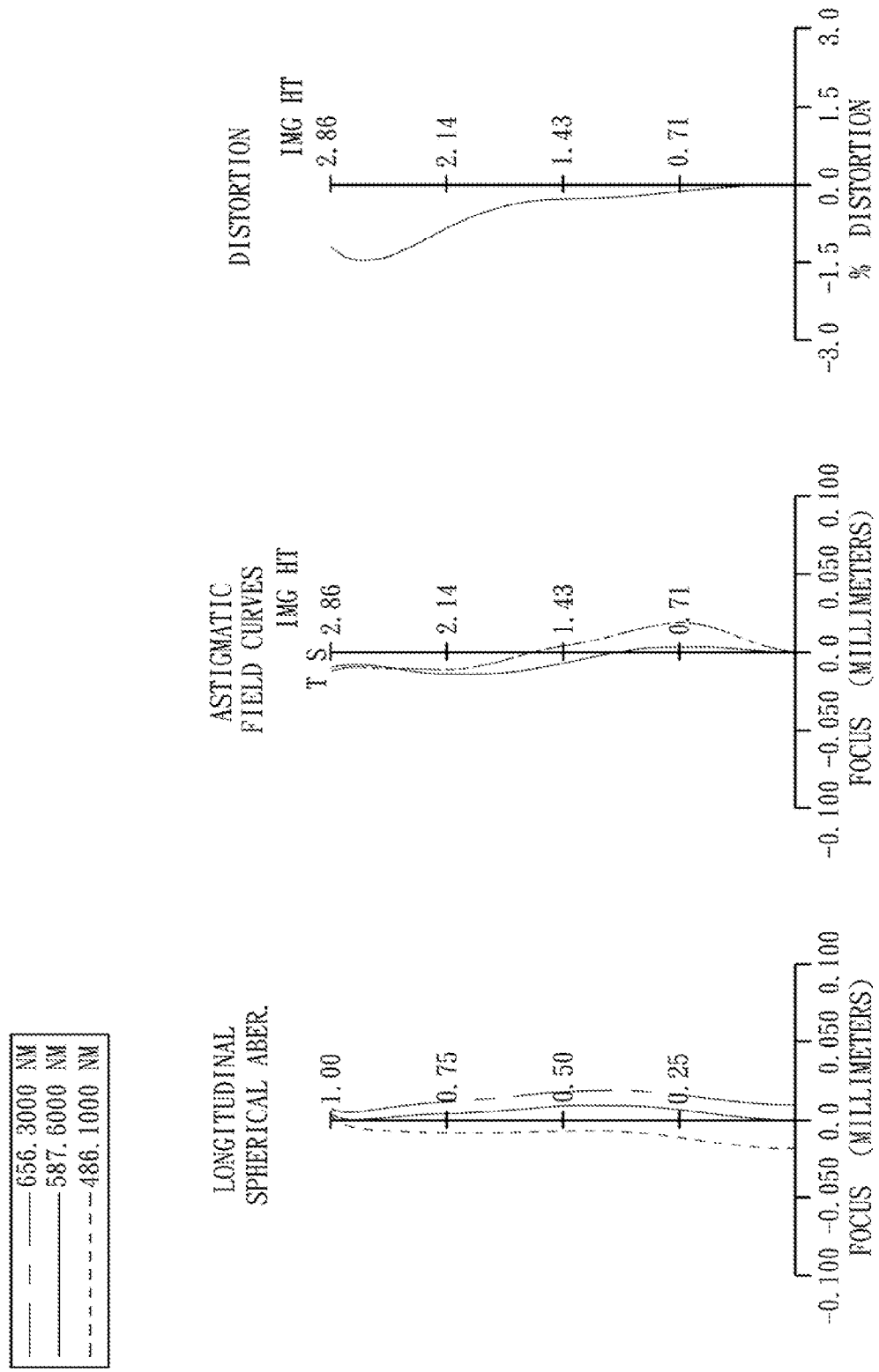
FIG. 8 shows spherical aberration curves, astigmatic field curves and a distortion curve of the image capturing optical lens assembly according to the fourth embodiment.

FIG. 7 is a schematic view of an image capturing optical lens assembly according to the fourth embodiment of the present disclosure. FIG. 8 shows spherical aberration curves, astigmatic field curves and a distortion curve of the image capturing optical lens assembly according to the fourth embodiment. In FIG. 7, the image capturing optical lens assembly includes, in order from an object side to an image side, an aperture stop 400, the first lens element 410, the second lens element 420, the third lens element 430, the fourth lens element 440, the fifth lens element 450, a cover glass 470 and an image plane 460.

The first lens element 410 with positive refractive power has a convex object-side surface 411 and a concave image-side surface 412, and is made of plastic material. The object-side surface 411 and the image-side surface 412 of the first lens element 410 are aspheric.

The second lens element 420 with negative refractive power has a convex object-side surface 421 and a concave image-side surface 422, and is made of plastic material. The object-side surface 421 and the image-side surface 422 of the second lens element 420 are aspheric.

The third lens element 430 with positive refractive power has a convex object-side surface 431 and a concave image-side surface 432, and is made of plastic material. The object-side surface 431 and the image-side surface 432 of the third lens element 430 are aspheric.

The fourth lens element 440 with positive refractive power has a concave object-side surface 441 and a convex image-side surface 442, and is made of plastic material. The object-side surface 441 and the image-side surface 442 of the fourth lens element 440 are aspheric.

The fifth lens element 450 with negative refractive power has a concave object-side surface 451 and a convex image-side surface 452, and is made of plastic material. The object-side surface 451 and the image-side surface 452 of the fifth lens element 450 are aspheric. Moreover, the fifth lens element 450 has inflection points formed on the object-side surface 451 thereof.

The cover glass 470 is located between the fifth lens element 450 and the image plane 460, and will not affect the focal length of the image capturing optical lens assembly.

The equation of the aspheric surface profiles of the above Jens elements of the fourth embodiment is the same as that of the first embodiment, and will not be stated herein again.

In the image capturing optical lens assembly according to the fourth embodiment, the definitions of f, Fno, HFOV, V1, V2, f1, f2, f3, f4, R9, R10, T23, T34, SD, TD, TTL and ImgH are the same as those stated in the first embodiment with corresponding values for the fourth embodiment. Moreover, these parameters have the following values and satisfy the following relationships:

| f(mm) | 4.27 | f1/f2 | −0.66 |
|---|---|---|---|
| Fno | 2.66 | (R9 + R10)/(R9 − R10) | −1.15 |
| HFOV(deg.) | 34.1 | T23/T34 | 0.47 |
| V1 − V2 | 32.1 | SD/TD | 0.93 |
| f/f3 | 0.10 | TTL/ImgH | 1.68 |
| f4/f | 0.53 | | |

The detailed optical data of the fourth embodiment are shown in Table 7 and the aspheric surface data are shown in Table 8 below.

TABLE 7

4th Embodiment
f = 4.27 mm, Fno = 2.66, HFOV = 34.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.258 | | | | |
| 2 | Lens 1 | 1.396360 (ASP) | 0.502 | Plastic | 1.544 | 55.9 | 3.13 |
| 3 | | 6.788900 (ASP) | 0.104 | | | | |
| 4 | Lens 2 | 5.714800 (ASP) | 0.265 | Plastic | 1.634 | 23.8 | −4.77 |
| 5 | | 1.942270 (ASP) | 0.243 | | | | |
| 6 | Lens 3 | 3.403400 (ASP) | 0.533 | Plastic | 1.634 | 23.8 | 44.59 |
| 7 | | 3.634100 (ASP) | 0.516 | | | | |
| 8 | Lens 4 | −7.746300 (ASP) | 0.807 | Plastic | 1.544 | 55.9 | 2.28 |
| 9 | | −1.108970 (ASP) | 0.436 | | | | |
| 10 | Lens 5 | −1.085210 (ASP) | 0.320 | Plastic | 1.544 | 55.9 | −2.16 |
| 11 | | −15.748000 (ASP) | 0.600 | | | | |
| 12 | Cover-Glass | Plano | 0.300 | Glass | 1.517 | 64.2 | — |
| 13 | | Plano | 0.287 | | | | |
| 14 | Image | Plano | — | | | | |

Note:
Reference wavelength (d-line) is 587.6 nm.

TABLE 8

Aspheric Coefficients

| Surface # | 2 | 3 | 4 | 5 | 6 |
|---|---|---|---|---|---|
| k = | −4.05618E−01 | −1.00000E+00 | −1.20000E+02 | −1.33134E+01 | −3.62559E+01 |
| A4 = | 3.20888E−02 | −3.47905E−03 | −3.61509E−04 | 1.64129E−01 | 3.43242E−02 |
| A6 = | 3.03468E−02 | 3.72158E−02 | 5.12939E−02 | −7.06107E−02 | −9.40946E−02 |
| A8 = | −1.17877E−02 | 6.70206E−02 | −2.89961E−02 | 1.64210E−01 | 9.89286E−02 |
| A10 = | 7.08788E−02 | −1.77249E−01 | −1.93479E−01 | −4.66965E−02 | −2.78582E−02 |
| A12 = | −6.36927E−02 | 4.13240E−02 | 1.54871E−01 | −3.01975E−01 | −2.21727E−02 |
| A14 = | 3.69486E−02 | −5.88611E−03 | −1.33431E−01 | 3.37864E−01 | 1.18685E−02 |

| Surface # | 7 | 8 | 9 | 10 | 11 |
|---|---|---|---|---|---|
| k = | −1.19891E+01 | 3.21957E+00 | −7.75317E−01 | −1.97376E+00 | −1.00000E+00 |
| A4 = | 1.48700E−05 | −8.34866E−02 | 6.25146E−02 | 9.41241E−02 | 2.02655E−02 |
| A6 = | −2.37044E−03 | 3.78214E−02 | −2.43704E−02 | −3.24026E−02 | −1.82210E−02 |
| A8 = | −1.33920E−02 | 7.10918E−03 | 3.50142E−02 | 7.04661E−03 | 3.93128E−03 |
| A10 = | 1.36999E−02 | −1.22692E−02 | −9.29702E−03 | −7.62283E−04 | −3.55580E−04 |
| A12 = | −7.66405E−04 | 8.57666E−04 | −6.94173E−05 | 1.26112E−05 | −2.34308E−05 |
| A14 = | −1.65162E−03 | 6.80870E−04 | 9.34536E−05 | 2.85286E−06 | 5.02635E−06 |

Figure 9:
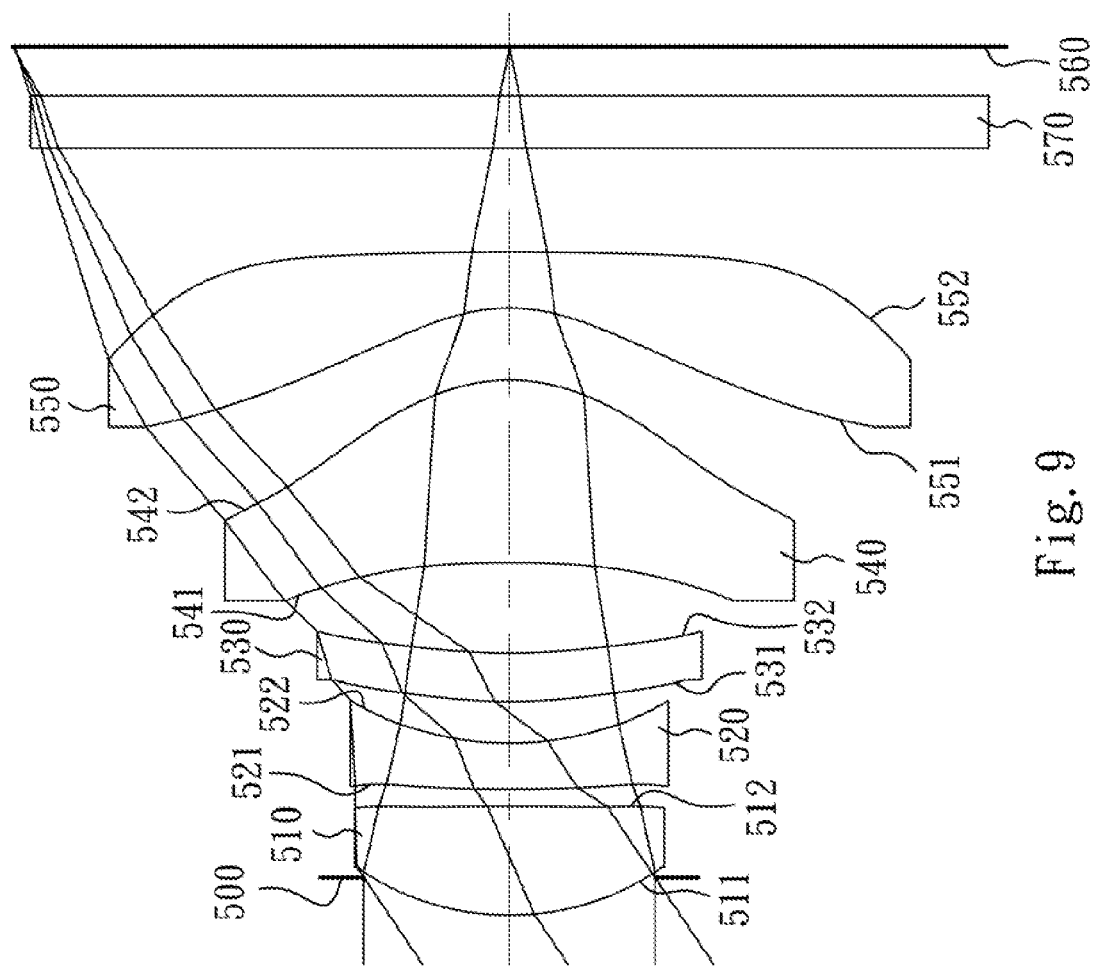
FIG. 9 is a schematic view of an image capturing optical lens assembly according to the fifth embodiment of the present disclosure.
Figure 10:
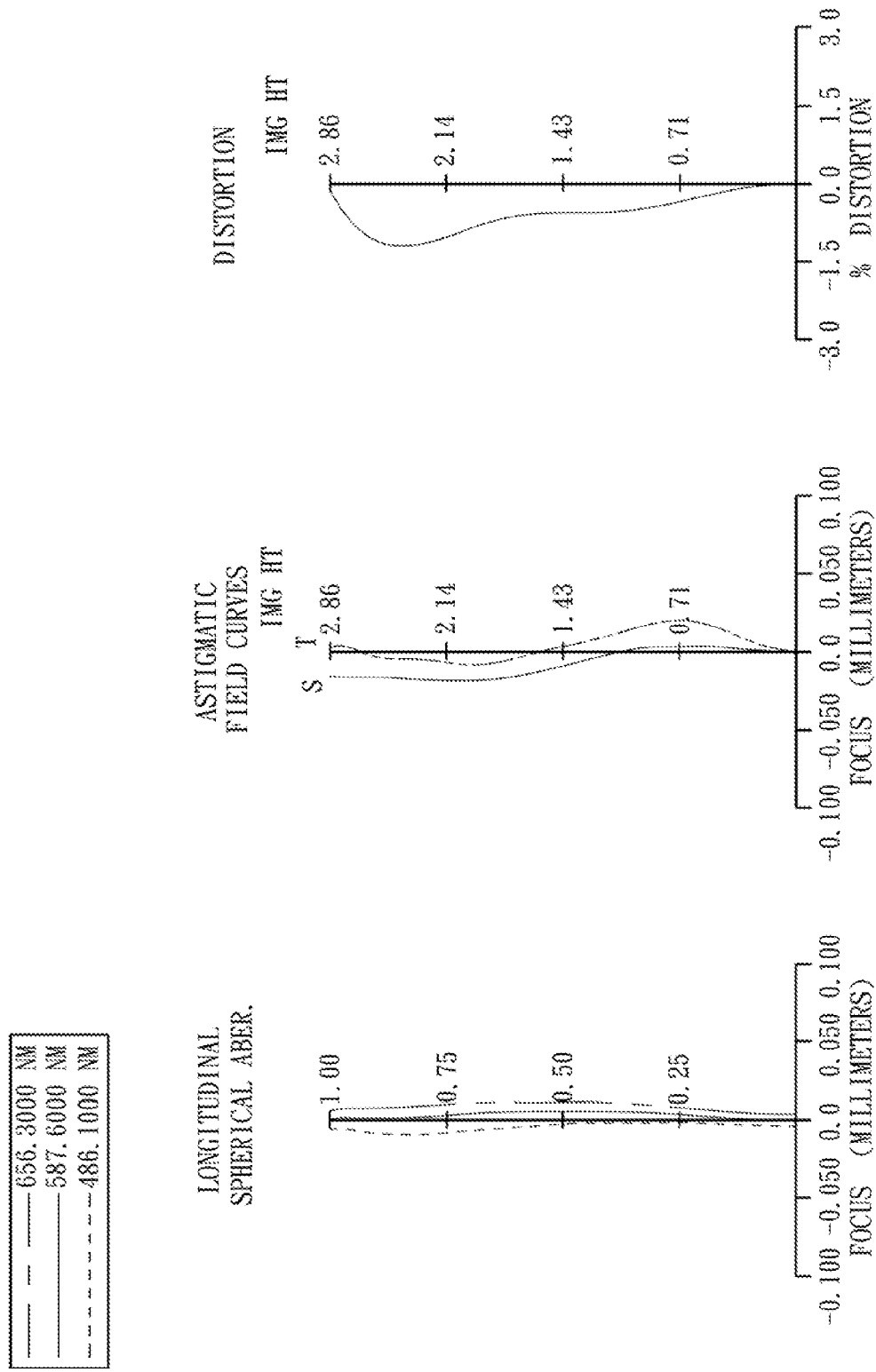
FIG. 10 shows spherical aberration curves, astigmatic field curves and a distortion curve of the image capturing optical lens assembly according to the fifth embodiment.

FIG. 9 is a schematic view of an image capturing optical lens assembly according to the fifth embodiment of the present disclosure. FIG. 10 shows spherical aberration curves, astigmatic field curves and a distortion curve of the image capturing optical lens assembly according to the fifth embodiment. In FIG. 9, the image capturing optical lens assembly includes, in order from an object side to an image side, an aperture stop 500, the first lens element 510, the second lens element 520, the third lens element 530, the fourth lens element 540, the fifth lens element 550, a cover glass 570 and an image plane 560.

The first lens element 510 with positive refractive power has a convex object-side surface 511 and a convex image-side surface 512, and is made of plastic material. The object-side surface 511 and the image-side surface 512 of the first lens element 510 are aspheric.

The second lens element 520 with negative refractive power has a convex object-side surface 521 and a concave image-side surface 522, and is made of plastic material. The object-side surface 521 and the image-side surface 522 of the second lens element 520 are aspheric.

The third lens element 530 with positive refractive power has a convex object-side surface 531 and a concave image-side surface 532, and is made of plastic material. The object-side surface 531 and the image-side surface 532 of the third lens element 530 are aspheric.

The fourth lens element 540 with positive refractive power has a concave object-side surface 541 and a convex image-side surface 542, and is made of plastic material. The object-side surface 541 and the image-side surface 542 of the fourth lens element 540 are aspheric.

The fifth lens element 550 with negative refractive power has a concave object-side surface 551 and a convex image-side surface 552, and is made of plastic material. The object-side surface 551 and the image-side surface 552 of the fifth lens element 550 are aspheric. Moreover, the fifth lens element 550 has inflection points formed on the object-side surface 551 thereof.

The cover glass 570 is located between the fifth lens element 550 and the image plane 560, and will not affect the focal length of the image capturing optical lens assembly.

The equation of the aspheric surface profiles of the above lens elements of the fifth embodiment is the same as that of the first embodiment, and will not be stated herein again.

In the image capturing optical lens assembly according to the fifth embodiment, the definitions of f, Fno, HFOV, V1, V2, f1, f2, f3, f4, R9, R10, T23, T34, SD, TD, TTL and ImgH are the same as those stated in the first embodiment with corresponding values for the fifth embodiment. Moreover, these parameters have the following values and satisfy the following relationships:

| f(mm) | 4.23 | f1/f2 | −0.79 |
|---|---|---|---|
| Fno | 2.52 | (R9 + R10)/(R9 − R10) | −1.14 |
| HFOV(deg.) | 34.1 | T23/T34 | 0.46 |
| V1 − V2 | 32.1 | SD/TD | 0.94 |
| f/f3 | 0.16 | TTL/ImgH | 1.72 |
| f4/f | 0.50 | | |

The detailed optical data of the fifth embodiment are shown in Table 9 and the aspheric surface data are shown in Table 10 below.

TABLE 9

5th Embodiment
f = 4.23 mm, Fno = 2.52, HFOV = 34.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.217 | | | | |

TABLE 9-continued

5th Embodiment
f = 4.23 mm, Fno = 2.52, HFOV = 34.1 deg.

| Surface # | | Curvature Radius | Thickness | Material | Index | Abbe # | Focal length |
|---|---|---|---|---|---|---|---|
| 2 | Lens 1 | 1.575050 (ASP) | 0.627 | Plastic | 1.544 | 55.9 | 2.61 |
| 3 | | −12.230800 (ASP) | 0.100 | | | | |
| 4 | Lens 2 | 14.705900 (ASP) | 0.265 | Plastic | 1.634 | 23.8 | −3.28 |
| 5 | | 1.809230 (ASP) | 0.244 | | | | |
| 6 | Lens 3 | 3.048400 (ASP) | 0.276 | Plastic | 1.634 | 23.8 | 25.80 |
| 7 | | 3.614900 (ASP) | 0.525 | | | | |
| 8 | Lens 4 | −7.573300 (ASP) | 1.050 | Plastic | 1.544 | 55.9 | 2.10 |
| 9 | | −1.042860 (ASP) | 0.419 | | | | |
| 10 | Lens 5 | −1.013500 (ASP) | 0.320 | Plastic | 1.544 | 55.9 | −2.01 |
| 11 | | −15.528000 (ASP) | 0.600 | | | | |
| 12 | Cover-Glass | Plano | 0.300 | Glass | 1.517 | 64.2 | — |
| 13 | | Plano | 0.284 | | | | |
| 14 | Image | Plano | — | | | | |

Note:
Reference wavelength (d-line) is 587.6 nm.

TABLE 10

Aspheric Coefficients

| | Surface # | | | | |
|---|---|---|---|---|---|
| | 2 | 3 | 4 | 5 | 6 |
| k = | −5.65475E−01 | −1.00000E+00 | −9.00000E+01 | −1.04714E+01 | −4.33121E+01 |
| A4 = | 2.32351E−02 | 1.34557E−01 | 1.06961E−01 | 1.86674E−01 | 4.69114E−02 |
| A6 = | 2.85015E−02 | −1.28051E−01 | −1.40594E−01 | −1.24335E−01 | −9.99646E−02 |
| A8 = | −3.10285E−02 | 5.85884E−02 | 2.66714E−02 | 5.69635E−02 | 9.72164E−02 |
| A10 = | 4.86893E−02 | −9.57932E−02 | −9.55417E−02 | 5.97039E−03 | −1.68423E−02 |
| A12 = | −3.59765E−02 | 7.06223E−02 | 7.51827E−02 | −3.57068E−02 | −8.05848E−03 |
| A14 = | 3.26164E−03 | −3.83810E−02 | −2.38276E−02 | 4.00795E−02 | 1.65030E−04 |

| | Surface # | | | | |
|---|---|---|---|---|---|
| | 7 | 8 | 9 | 10 | 11 |
| k = | −4.63235E+01 | 1.44798E+01 | −8.41292E−01 | −2.37959E+00 | −1.00000E+00 |
| A4 = | 1.28324E−02 | −9.77702E−02 | 8.90970E−02 | 8.96719E−02 | 2.79255E−02 |
| A6 = | −4.36522E−03 | 5.82959E−02 | −3.94100E−02 | −3.38498E−02 | −2.08348E−02 |
| A8 = | −2.44200E−02 | 2.98358E−03 | 3.59292E−02 | 7.13487E−03 | 4.14541E−03 |
| A10 = | 2.38416E−02 | −1.43213E−02 | −8.80877E−03 | −7.16485E−04 | −3.26433E−04 |
| A12 = | 1.26770E−02 | 8.86338E−04 | −2.46154E−06 | 1.69567E−05 | −2.55539E−05 |
| A14 = | −1.01834E−02 | 1.40737E−03 | 1.18587E−04 | 1.25119E−06 | 4.56094E−06 |

Figure 11:
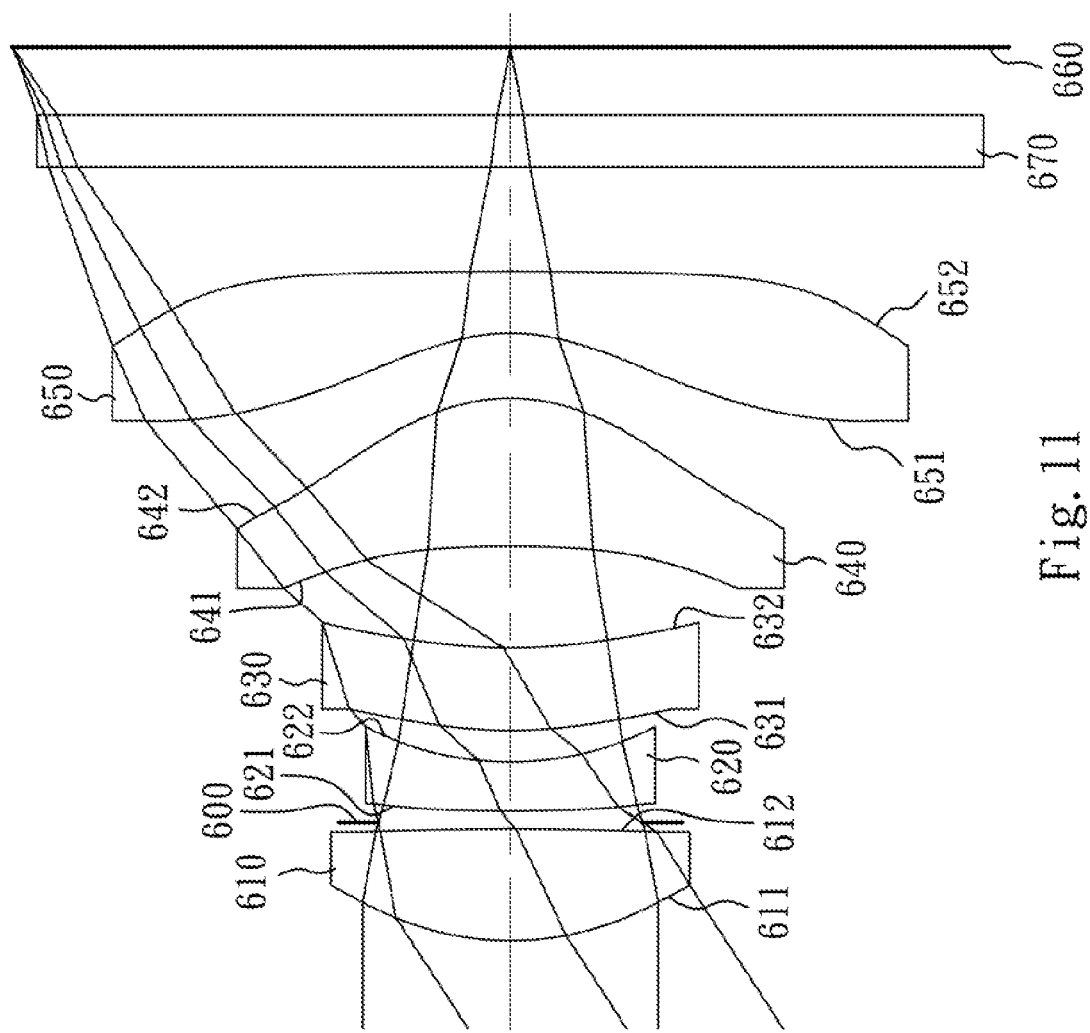
FIG. 11 is a schematic view of an image capturing optical lens assembly according to the sixth embodiment of the present disclosure.
Figure 12:
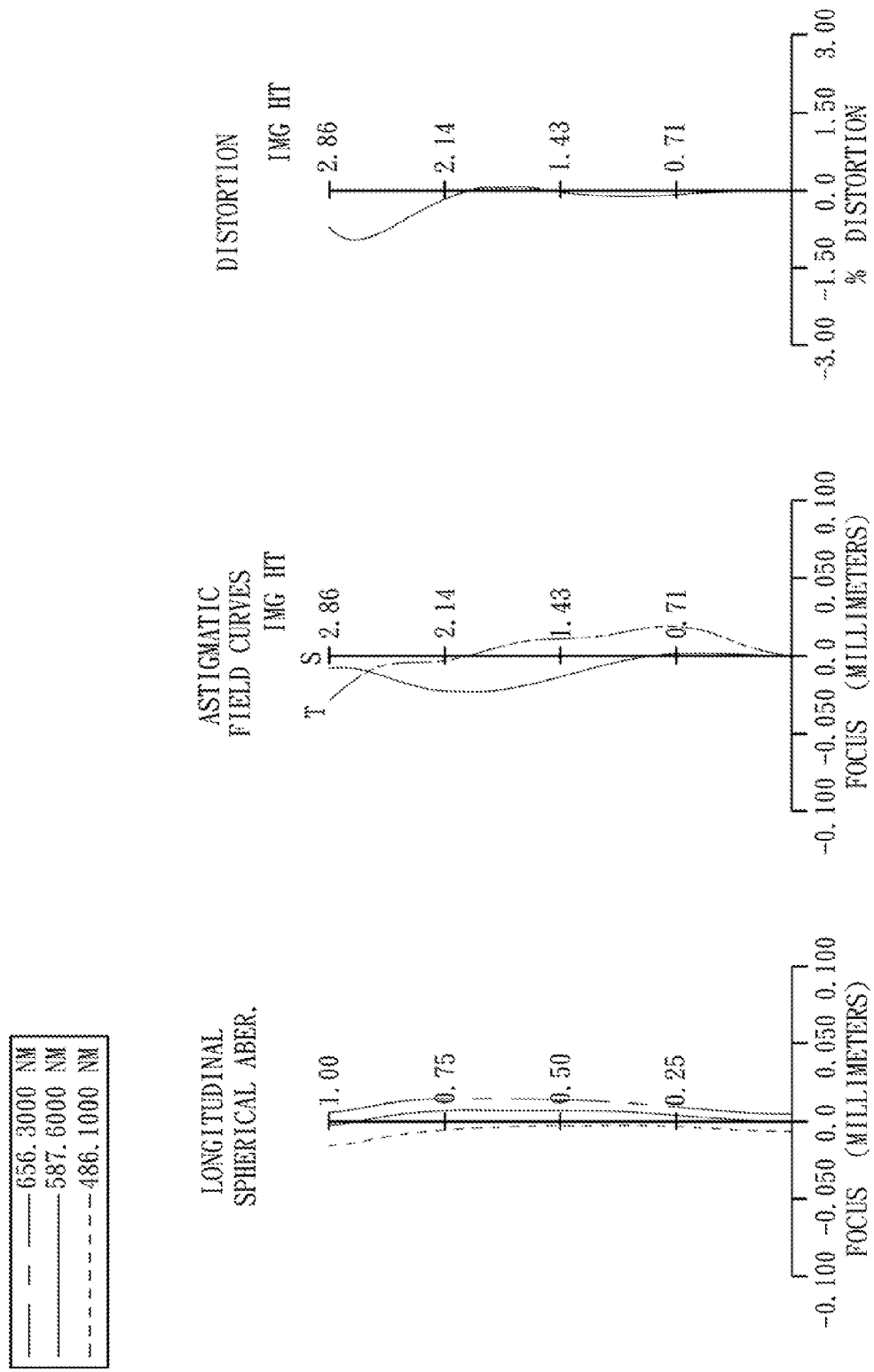
FIG. 12 shows spherical aberration curves, astigmatic field curves and a distortion curve of the image capturing optical lens assembly according to the sixth embodiment.

FIG. 11 is a schematic view of an image capturing optical lens assembly according to the sixth embodiment of the present disclosure. FIG. 12 shows spherical aberration curves, astigmatic field curves and a distortion curve of the image capturing optical lens assembly according to the sixth embodiment. In FIG. 11, the image capturing optical lens assembly includes, in order from an object side to an image side, the first lens element 610, an aperture stop 600, the second lens element 620, the third lens element 630, the fourth lens element 640, the fifth lens element 650, a cover glass 670 and an image plane 660.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a convex object-side surface 621 and a concave image-side surface 622, and is made of plastic material. The object-side surface 621 and the image-side surface 622 of the second lens element 620 are aspheric.

The third lens element 630 with positive refractive power has a convex object-side surface 631 and a concave image-side surface 632, and is made of plastic material. The object-side surface 631 and the image-side surface 632 of the third lens element 630 are aspheric.

The fourth lens element 640 with positive refractive power has a concave object-side surface 641 and a convex image-side surface 642, and is made of plastic material. The object-side surface 641 and the image-side surface 642 of the fourth lens element 640 are aspheric.

The fifth lens element 650 with negative refractive power has a concave object-side surface 651 and a convex image-side surface 652, and is made of plastic material. The object-side surface 651 and the image-side surface 652 of the fifth lens element 650 are aspheric. Moreover, the fifth lens element 650 has inflection points formed on the object-side surface 651 thereof.

The cover glass 670 is located between the fifth lens element 650 and the image plane 660, and will not affect the focal length of the image capturing optical lens assembly.

The equation of the aspheric surface profiles of the above lens elements of the sixth embodiment is the same as that of the first embodiment, and will not be stated herein again.

In the image capturing optical lens assembly according to the sixth embodiment, the definitions of f, Fno, HFOV, V1, V2, f1, f2, f3, f4, R9, R10, T23, T34, SD, TD, TTL and ImgH are the same as those stated in the first embodiment with corresponding values for the sixth embodiment. Moreover, these parameters have the following values and satisfy the following relationships:

| f(mm) | 4.40 | f1/f2 | −0.85 |
|---|---|---|---|
| Fno | 2.60 | (R9 + R10)/(R9 − R10) | −1.10 |
| HFOV(deg.) | 33.2 | T23/T34 | 0.32 |

| | | | |
|---|---|---|---|
| V1 − V2 | 32.1 | SD/TD | 0.82 |
| f/f3 | 0.29 | TTL/ImgH | 1.76 |
| f4/f | 0.50 | | |

The detailed optical data of the sixth embodiment are shown in Table 11 and the aspheric surface data are shown in Table 12 below.

TABLE 11

5th Embodiment
f = 4.40 mm, Fno = 2.60, HFOV = 33.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.683370 (ASP) | 0.645 | Plastic | 1.544 | 55.9 | 2.76 |
| 2 | | −11.992800 (ASP) | 0.035 | | | | |
| 3 | Ape. Stop | Plano | 0.065 | | | | |
| 4 | Lens 2 | 13.698600 (ASP) | 0.280 | Plastic | 1.634 | 23.8 | −3.23 |
| 5 | | 1.765980 (ASP) | 0.184 | | | | |
| 6 | Lens 3 | 2.574680 (ASP) | 0.471 | Plastic | 1.633 | 23.4 | 15.02 |
| 7 | | 3.280900 (ASP) | 0.582 | | | | |
| 8 | Lens 4 | −7.418900 (ASP) | 0.849 | Plastic | 1.544 | 55.9 | 2.21 |
| 9 | | −1.078030 (ASP) | 0.377 | | | | |
| 10 | Lens 5 | −1.113820 (ASP) | 0.350 | Plastic | 1.544 | 55.9 | −2.16 |
| 11 | | −24.254200 (ASP) | 0.600 | | | | |
| 12 | Cover-Glass | Plano | 0.300 | Glass | 1.517 | 64.2 | — |
| 13 | | Plano | 0.384 | | | | |
| 14 | Image | Plano | — | | | | |

Note:
Reference wavelength (d-line) is 587.6 nm.

TABLE 12

Aspheric Coefficients

| | Surface # | | | | |
|---|---|---|---|---|---|
| | 1 | 2 | 4 | 5 | 6 |
| k = | −7.95363E−01 | −1.00000E+00 | −9.00000E+01 | −9.31008E+00 | −2.26453E+01 |
| A4 = | 1.21130E−02 | 7.95628E−02 | 7.71133E−02 | 1.49572E−01 | 5.84730E−02 |
| A6 = | 8.29191E−03 | −1.15102E−01 | −5.75647E−02 | −7.80682E−02 | −1.37701E−01 |
| A8 = | −3.16940E−02 | 1.14380E−01 | 8.17528E−02 | 1.15666E−01 | 1.34107E−01 |
| A10 = | 3.64252E−02 | −1.20757E−01 | −1.23138E−01 | −6.28572E−02 | −3.99191E−02 |
| A12 = | −2.39299E−02 | 4.95671E−02 | 6.82891E−02 | 1.02689E−02 | |

| | Surface # | | | | |
|---|---|---|---|---|---|
| | 7 | 8 | 9 | 10 | 11 |
| k = | −1.57082E+01 | 1.59757E+00 | −8.39115E−01 | −2.12771E+00 | −1.00000E+00 |
| A4 = | 1.75525E−02 | −8.74946E−02 | 8.17336E−02 | 1.06240E−01 | 1.71818E−02 |
| A6 = | −1.63691E−02 | 3.39475E−02 | −3.34545E−02 | −3.40381E−02 | −1.46079E−02 |
| A8 = | −1.87046E−02 | 1.11678E−02 | 3.65165E−02 | 6.78338E−03 | 3.00054E−03 |
| A10 = | 2.78991E−02 | −1.43375E−02 | −9.55402E−03 | −7.34436E−04 | −2.70471E−04 |
| A12 = | −5.12225E−04 | 7.31358E−04 | −1.93053E−04 | 2.51859E−05 | −1.42339E−05 |
| A14 = | −4.12593E−03 | 1.33508E−03 | 1.42641E−04 | 1.36232E−06 | 3.75991E−06 |

Figure 13:
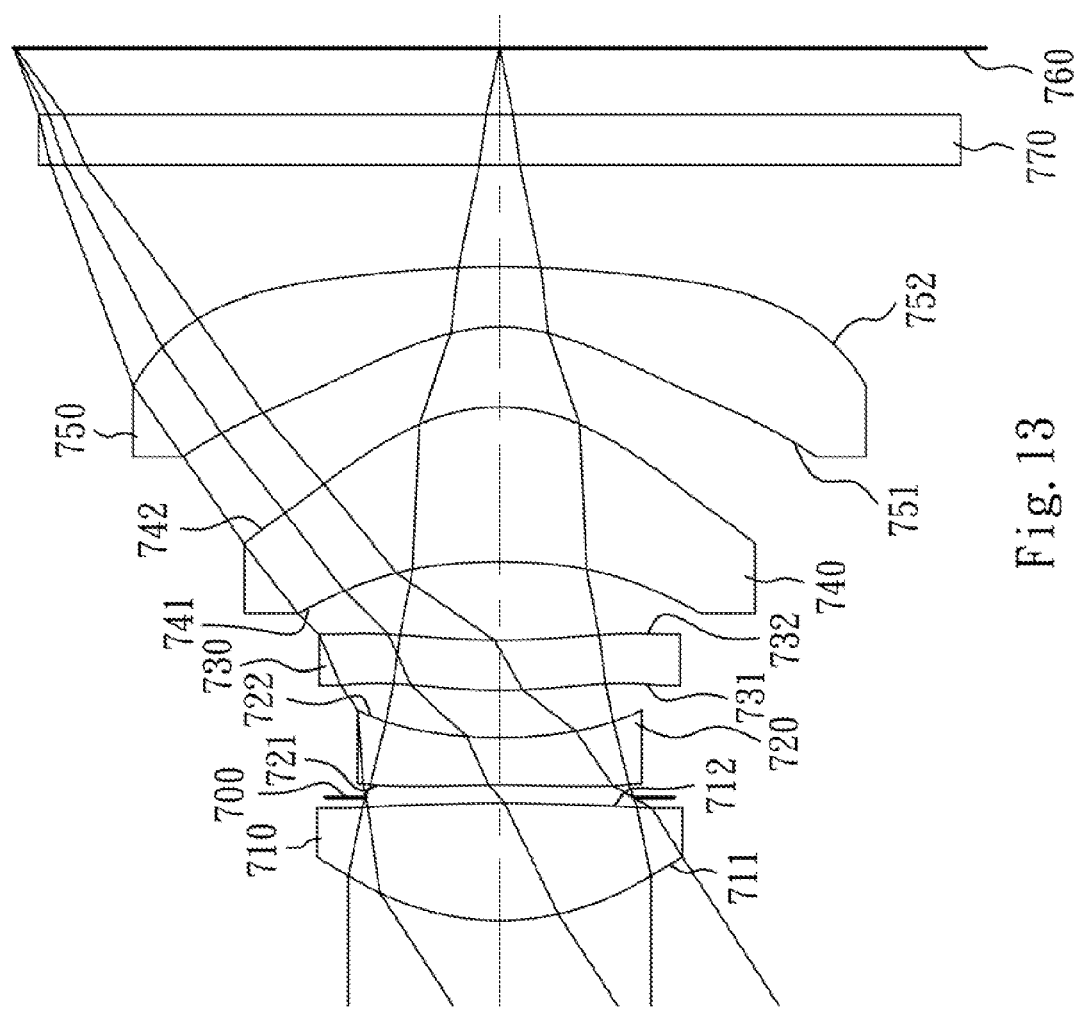
FIG. 13 is a schematic view of an image capturing optical lens assembly according to the seventh embodiment of the present disclosure.
Figure 14:
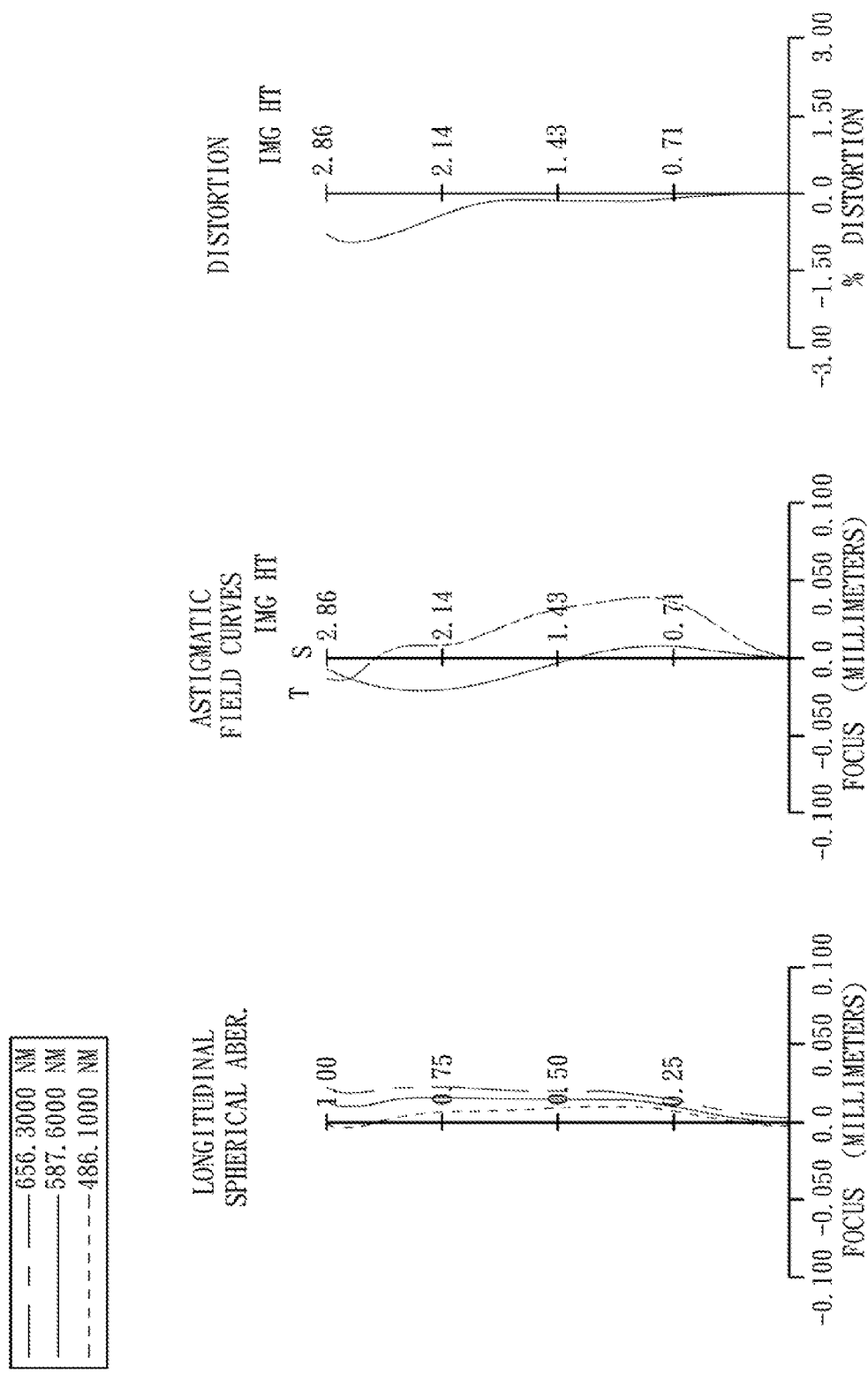
FIG. 14 shows spherical aberration curves, astigmatic field curves and a distortion curve of the image capturing optical lens assembly according to the seventh embodiment.

FIG. 13 is a schematic view of an image capturing optical lens assembly according to the seventh embodiment of the present disclosure. FIG. 14 shows spherical aberration curves, astigmatic field curves and a distortion curve of the image capturing optical lens assembly according to the seventh embodiment. In FIG. 13, the image capturing optical lens assembly includes, in order from an object side to an image side, the first lens element 710, an aperture stop 700, the second lens element 720, the third lens element 730, the fourth lens element 740, the fifth lens element 750, a cover glass 770 and an image plane 760.

The first lens element 710 with positive refractive power has a convex object-side surface 711 and a convex image-side surface 712, and is made of plastic material. The object-side surface 711 and the image-side surface 712 of the first lens element 710 are aspheric.

The second lens element 720 with negative refractive power has a concave object-side surface 721 and a concave image-side surface 722, and is made of plastic material. The object-side surface 721 and the image-side surface 722 of the second lens element 720 are aspheric.

The third lens element 730 with positive refractive power has a convex object-side surface 731 and a concave image-side surface 732, and is made of plastic material. The object-side surface 731 and the image-side surface 732 of the third lens element 730 are aspheric.

The fourth lens element 740 with positive refractive power has a concave object-side surface 741 and a convex image-side surface 742, and is made of plastic material. The object-side surface 741 and the image-side surface 742 of the fourth lens element 740 are aspheric.

The fifth lens element 750 with negative refractive power has a concave object-side surface 751 and a convex image-side surface 752, and is made of plastic material. The object-side surface 751 and the image-side surface 752 of the fifth lens element 750 are aspheric. Moreover, the fifth lens element 750 has inflection points formed on the object-side surface 751 thereof.

The cover glass 770 is located between the fifth lens element 750 and the image plane 760, and will not affect the focal length of the image capturing optical lens assembly.

The equation of the aspheric surface profiles of the above lens elements of the seventh embodiment is the same as that of the first embodiment, and will not be stated herein again.

In the image capturing optical lens assembly according to the seventh embodiment, the definitions of f, Fno, HFOV, V1, V2, f1, f2, f3, f4, R9, R10, T23, T34, SD, TD, TTL and ImgH are the same as those stated in the first embodiment with corresponding values for the seventh embodiment. Moreover, these parameters have the following values and satisfy the following relationships:

| f(mm) | 4.41 | f1/f2 | −0.76 |
| Fno | 2.48 | (R9 + R10)/(R9 − R10) | −1.50 |
| HFOV(deg.) | 33.1 | T23/T34 | 0.61 |
| V1 − V2 | 32.1 | SD/TD | 0.81 |
| f/f3 | 0.19 | TTL/ImgH | 1.76 |
| f4/f | 0.59 | | |

The detailed optical data of the seventh embodiment are shown in Table 13 and the aspheric surface data are shown in Table 14 below.

TABLE 13

7th Embodiment
f = 4.41 mm, Fno = 2.48, HFOV = 33.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.586100 (ASP) | 0.693 | Plastic | 1.544 | 55.9 | 2.51 |
| 2 | | −8.236500 (ASP) | 0.032 | | | | |
| 3 | Ape. Stop | Plano | 0.071 | | | | |
| 4 | Lens 2 | −7.537300 (ASP) | 0.280 | Plastic | 1.634 | 23.8 | −3.29 |
| 5 | | 2.929770 (ASP) | 0.281 | | | | |
| 6 | Lens 3 | 3.248900 (ASP) | 0.291 | Plastic | 1.634 | 23.8 | 22.93 |
| 7 | | 4.038500 (ASP) | 0.464 | | | | |
| 8 | Lens 4 | −3.529600 (ASP) | 0.907 | Plastic | 1.544 | 55.9 | 2.58 |
| 9 | | −1.094980 (ASP) | 0.474 | | | | |
| 10 | Lens 5 | −1.064000 (ASP) | 0.350 | Plastic | 1.544 | 55.9 | −2.52 |
| 11 | | −5.320000 (ASP) | 0.600 | | | | |
| 12 | Cover-Glass | Plano | 0.300 | Glass | 1.517 | 64.2 | — |
| 13 | | Plano | 0.386 | | | | |
| 14 | Image | Plano | — | | | | |

Note:
Reference wavelength (d-line) is 587.6 nm.

TABLE 14

Aspheric Coefficients

| | Surface # | | | | |
|---|---|---|---|---|---|
| | 1 | 2 | 4 | 5 | 6 |
| k = | −7.18808E−01 | −1.00000E+00 | 1.28070E+00 | −1.90457E+01 | −5.34729E+01 |
| A4 = | 1.45322E−02 | 8.23012E−02 | 1.73026E−01 | 1.62357E−01 | 1.18653E−02 |
| A6 = | 1.11999E−02 | −9.44761E−02 | −1.54764E−01 | −7.32961E−02 | −1.81555E−01 |
| A8 = | −3.50932E−02 | 9.03704E−02 | 1.77281E−01 | 6.41200E−02 | 1.03350E−01 |
| A10 = | 3.93309E−02 | −9.53522E−02 | −1.28798E−01 | 3.95562E−02 | −2.80814E−03 |
| A12 = | −2.46680E−02 | 3.66860E−02 | 4.09818E−02 | −2.93494E−02 | |

| | Surface # | | | | |
|---|---|---|---|---|---|
| | 7 | 8 | 9 | 10 | 11 |
| k = | −5.34581E+01 | 4.08788E+00 | −7.90759E−01 | −1.67694E+00 | −1.00000E+00 |
| A4 = | −2.31967E−02 | −1.04070E−01 | 4.74265E−02 | 1.14871E−01 | 4.09053E−02 |
| A6 = | −3.45827E−02 | 5.35623E−02 | −2.52696E−02 | −3.76490E−02 | −2.27063E−02 |

TABLE 14-continued

| Aspheric Coefficients | | | | | |
|---|---|---|---|---|---|
| A8 = | −3.00952E−02 | 1.85905E−02 | 3.92005E−02 | 6.34757E−03 | 4.14248E−03 |
| A10 = | 3.03420E−02 | −2.40069E−02 | −1.00443E−02 | −7.40747E−04 | −3.05237E−04 |
| A12 = | 1.64141E−02 | −2.27144E−03 | −5.25842E−04 | 2.97786E−05 | −2.45811E−05 |
| A14 = | −6.05809E−03 | 6.19676E−03 | 1.35472E−04 | 1.26745E−06 | 2.22362E−06 |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image capturing optical lens assembly comprising, in order from an object side to an image side:
   a first lens element with positive refractive power having a convex object-side surface;
   a second lens element with negative refractive power;
   a third lens element with positive refractive power having a convex object-side surface and a concave image-side surface, wherein at least one of the object-side surface and the image-side surface of the third lens element is aspheric;
   a fourth lens element with positive refractive power made of plastic material, and having a concave object-side surface and a convex image-side surface, wherein at least one of the object-side surface and the image-side surface of the fourth lens element is aspheric; and
   a fifth lens element with refractive power made of plastic material, and having a convex image-side surface, wherein at least one of the object-side surface and the image-side surface of the fifth lens element is aspheric;
   wherein a focal length of the image capturing optical lens assembly is f, a focal length of the third lens element is f3, and a focal length of the fourth lens element is f4, the following relationships are satisfied:

$0 < f/f3 < 1.2$;

and $0.3 < f4/f < 0.65$.

2. The image capturing optical lens assembly of claim 1, further comprising:
   an image sensor located on an image plane, wherein a maximum image height of the image capturing optical lens assembly is ImgH, and an axial distance between the object-side surface of the first lens element and the image plane is TTL, the following relationship is satisfied:

$TTL/ImgH < 2.00$.

3. The image capturing optical lens assembly of claim 1, wherein the fifth lens element has negative refractive power, and the fifth lens element has at least one inflection point formed on at least one of the object-side surface and the image-side surface thereof.

4. The image capturing optical lens assembly of claim 3, wherein a curvature radius of the object-side surface of the fifth lens element is R9, and a curvature radius of the image-side surface of the fifth lens element is R10, the following relationship is satisfied:

$-3.0 < (R9+R10)/(R9-R10) < -1.0$.

5. The image capturing optical lens assembly of claim 3, wherein the Abbe number of the first lens element is V1, and the Abbe number of the second lens element is V2, the following relationship is satisfied:

$28 < V1-V2 < 45$.

6. The image capturing optical lens assembly of claim 5, wherein a focal length of the first lens element is f1, and a focal length of the second lens element is f2, the following relationship is satisfied:

$-1.3 < f1/f2 < -0.6$.

7. The image capturing optical lens assembly of claim 5, wherein an axial distance between the second lens element and the third lens element is T23, and an axial distance between the third lens element and the fourth lens element is T34, the following relationship is satisfied:

$0 < T23/T34 < 0.65$.

8. The image capturing optical lens assembly of claim 5, further comprising:
   a stop, wherein an axial distance between the stop and the image-side surface of the fifth lens element is SD, and an axial distance between the object-side surface of the first lens element and the image-side surface of the fifth lens element is TD, the following relationship is satisfied:

$0.7 < SD/TD < 0.9$.

9. An image capturing optical lens assembly comprising five non-cemented lens elements, in order from an object side to an image side:
   a first lens element with positive refractive power;
   a second lens element with negative refractive power;
   a third lens element with positive refractive power, and having a convex object-side surface and a concave image-side surface, wherein at least one of the object-side surface and the image-side surface of the third lens element is aspheric;
   a fourth lens element with positive refractive power made of plastic material, wherein at least one of the object-side surface and the image-side surface of the fourth lens element is aspheric; and
   a fifth lens element with refractive power made of plastic material, wherein at least one of the object-side surface and the image-side surface of the fifth lens element is aspheric;
   wherein the image capturing optical lens assembly further comprises a stop between an object and the second lens element, when a curvature radius of the object-side surface of the fifth lens element is R9, a curvature radius of the image-side surface of the fifth lens element is R10, a focal length of the fourth lens element is f4, and a focal length of the image capturing optical lens assembly is f, the following relationships are satisfied:

$-3.0<(R9+R10)/(R9-R10)<0;$ and $0.3<f4/f<0.65.$

10. The image capturing optical lens assembly of claim 9, wherein the first lens element has a convex object-side surface, and the fourth lens element has a concave object-side surface and a convex image-side surface.

11. The image capturing optical lens assembly of claim 10, wherein an axial distance between the second lens element and the third lens element is T23, and an axial distance between the third lens element and the fourth lens element is T34, the following relationship is satisfied:

$0<T23/T34<0.5.$

12. The image capturing optical lens assembly of claim 10, wherein the focal length of the image capturing optical lens assembly is f, and a focal length of the third lens element is f3, the following relationship is satisfied:

$0<f/f3<1.2.$

13. The image capturing optical lens assembly of claim 10, wherein the fifth lens element has negative refractive power, when the curvature radius of the object-side surface of the fifth lens element is R9, and the curvature radius of the image-side surface of the fifth lens element is R10, the following relationship is satisfied:

$-3.0<(R9+R10)/(R9-R10)<-1.0.$

14. The image capturing optical lens assembly of claim 13, wherein an axial distance between the stop and the image-side surface of the fifth lens is element is SD, and an axial distance between the object-side surface of the first lens element and the image-side surface of the fifth lens element is TD, the following relationship is satisfied:

$0.7<SD/TD<0.9.$

15. The image capturing optical lens assembly of claim 13, wherein a focal length of the first lens element is f1, and a focal length of the second lens element is f2, the following relationship is satisfied:

$-1.3<f1/f2<-0.6.$

16. An image capturing optical lens assembly comprising five non-cemented lens elements, in order from an object side to an image side:
- a first lens element with positive refractive power;
- a second lens element with negative refractive power;
- a third lens element with positive refractive power, wherein at least one of the object-side surface and the image-side surface of the third lens element is aspheric;
- a fourth lens element with positive refractive power made of plastic material, and having a concave object-side surface and a convex image-side surface, wherein at least one of the object-side surface and the image-side surface of the fourth lens element is aspheric; and
- a fifth lens element with refractive power made of, plastic material, and having a concave object-side surface and a convex image-side surface, wherein at least one of the object-side surface and the image-side surface of the fifth lens element is aspheric, and the fifth lens element has at least one inflection point formed on at least one of the object-side surface and the image-side surface thereof;
- wherein the image capturing optical lens assembly further comprises a stop located between an object and the second lens element, when an axial distance between the second lens element and the third lens element is T23, an axial distance between the third lens element and the fourth lens element is T34, a focal length of the image capturing optical lens assembly is f, and a focal length of the fourth lens element is f4, the following relationships are satisfied:

$0<T23/T34<0.65;$ and $0.3<f4/f<0.65.$

17. The image capturing optical lens assembly of claim 16, wherein the first lens element has a convex object-side surface, and the fifth lens element has negative refractive power.

18. The image capturing optical lens assembly of claim 17, wherein the axial distance between the second lens element and the third lens element is T23, and the axial distance between the third lens element and the fourth lens element is T34, the following relationship is satisfied:

$0<T23/T34<0.5.$

19. The image capturing optical lens assembly of claim 17, wherein a focal length of the first lens element is f1, and a focal length of the second lens element is f2, the following relationship is satisfied:

$-1.3<f1/f2<-0.6.$

20. The image capturing optical lens assembly of claim 17, wherein the focal length of the image capturing optical lens assembly is f, and a focal length of the third lens element is f3, the following relationships are satisfied:

$0<f/f3<1.2.$

21. The image capturing optical lens assembly of claim 17, wherein the third lens element has a convex object-side surface and a concave image-side surface.

22. The image capturing optical lens assembly of claim 21, wherein a curvature radius of the object-side surface of the fifth lens element is R9, and a curvature radius of the image-side surface of the fifth lens element is R10, the following relationship is satisfied:

$-3.0<(R9+R10)/(R9-R10)<-1.0.$

* * * * *